(12) United States Patent
Suzuki et al.

(10) Patent No.: US 12,043,548 B2
(45) Date of Patent: Jul. 23, 2024

(54) SYNTHETIC GRAPHITE MATERIAL, SYNTHETIC GRAPHITE MATERIAL PRODUCTION METHOD, NEGATIVE ELECTRODE FOR LITHIUM ION SECONDARY BATTERY, AND LITHIUM ION SECONDARY BATTERY

(71) Applicant: ENEOS CORPORATION, Tokyo (JP)

(72) Inventors: Takashi Suzuki, Tokyo (JP); Takashi Maeda, Tokyo (JP); Mitsuo Karakane, Tokyo (JP); Takahiro Shirai, Tokyo (JP); Hiroshi Kawachi, Tokyo (JP); Noriyuki Kiuchi, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 606 days.

(21) Appl. No.: 17/422,978

(22) PCT Filed: Jan. 14, 2020

(86) PCT No.: PCT/JP2020/000810
§ 371 (c)(1),
(2) Date: Jul. 14, 2021

(87) PCT Pub. No.: WO2020/149250
PCT Pub. Date: Jul. 23, 2020

(65) Prior Publication Data
US 2022/0073355 A1    Mar. 10, 2022

(30) Foreign Application Priority Data
Jan. 15, 2019    (JP) .................................. 2019-004664

(51) Int. Cl.
*C01B 32/20*    (2017.01)
*B01J 35/64*    (2024.01)
(Continued)

(52) U.S. Cl.
CPC .......... *C01B 32/205* (2017.08); *B01J 35/647* (2024.01); *C01B 32/21* (2017.08);
(Continued)

(58) Field of Classification Search
CPC ................ C01B 32/182; C01B 32/184; C01B 32/186; C01B 32/188; C01B 32/19;
(Continued)

(56) References Cited

U.S. PATENT DOCUMENTS

2013/0251620 A1*  9/2013  Suzuki .................. H01M 4/587
                                                           423/448
2017/0057825 A1*  3/2017  Suzuki .............. H01M 10/0525

FOREIGN PATENT DOCUMENTS

CN    102511096 A    6/2012
CN    106268917 A    1/2017
(Continued)

OTHER PUBLICATIONS

Mar. 17, 2023 Office Action issued in Chinese Patent Application No. 202080008973.3 (Year: 2023).*
(Continued)

*Primary Examiner* — Daniel C. McCracken
(74) *Attorney, Agent, or Firm* — Oliff PLC

(57) ABSTRACT

A synthetic graphite material, in which a size L (112) of a crystallite in a c-axis direction as calculated from a (112) diffraction line obtained by an X-ray wide angle diffraction method is in a range of 4 to 30 nm, a surface area based on a volume as calculated by a laser diffraction type particle size distribution measuring device is in a range of 0.22 to 1.70 m²/cm³, an oil absorption is in a range of 67 to 147 mL/100 g, a spectrum derived from carbon appearing in an electron spin resonance method as measured using an X band is in a range of 3200 to 3410 gauss, and ΔHpp, which is a line width of the spectrum as calculated from a first
(Continued)

derivative spectrum of the spectrum at a temperature of 4.8K, is in a range of 41 to 69 gauss.

5 Claims, 1 Drawing Sheet

(51) Int. Cl.
    *C01B 32/205*     (2017.01)
    *C01B 32/21*     (2017.01)
    *H01M 10/0525*     (2010.01)

(52) U.S. Cl.
    CPC ..... *H01M 10/0525* (2013.01); *C01P 2004/51* (2013.01); *C01P 2006/12* (2013.01)

(58) Field of Classification Search
    CPC ................ C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23
    See application file for complete search history.

(56) References Cited

FOREIGN PATENT DOCUMENTS

| | | |
|---|---|---|
| CN | 106268922 A | 1/2017 |
| EP | 2 579 368 A1 | 4/2013 |
| EP | 2 605 318 A1 | 6/2013 |
| EP | 2 626 933 A1 | 8/2013 |
| EP | 3 130 652 A1 | 2/2017 |
| EP | 3 319 154 A1 | 5/2018 |
| JP | 2012-128973 A | 7/2012 |
| JP | 2012-216545 A | 11/2012 |
| JP | 2013-209529 A | 10/2013 |
| JP | 5415684 B2 | 2/2014 |
| JP | 2016-164862 A | 9/2016 |
| JP | 2017-019915 A | 1/2017 |
| WO | 2012/020816 A1 | 2/2012 |

OTHER PUBLICATIONS

Sep. 15, 2022 Search Report Issued in European Patent Application No. 20741635.5 (Year: 2022).*
Mizushima, Electron spin resonance of carbon (I) Tanso 1966; 47: 30-34 (Year: 1996).*
Sep. 15, 2022 Search Report Issued in European Patent Application No. 20741635.5.
Ariyoshi, Kingo et al., "Twelve-volt 'lead-free' batteries: Mass balance in a cell to extend cycle life", Abstracts of the 51st Battery Discussion Meeting 3G15, p. 516, 2010.
Tsumura et al., "Carbon material for negative electrode for lithium ion secondary battery", Realize Corporation, pp. 3-4, 1996.
Mizushima, Sanchi. "Electron spin resonance of carbon(I)", Tanso, No. 47, pp. 30-34, 1966.
Mizushima, Sanchi. "Electron spin resonance of carbon(II)", Tanso, No. 50, pp. 20-25, 1969.
Matsubara, Keiko et al., "Electron Spin Resonance of Natural Graphite Powder Different in Grinding Method and Diameter", Tanso, No. 175. pp. 249-256, 1996.
Mar. 10, 2020 Search Report issued in International Patent Application No. PCT/JP2020/000810.
Mar. 17, 2023 Office Action issued in Chinese Patent Application No. 202080008973.3.

* cited by examiner

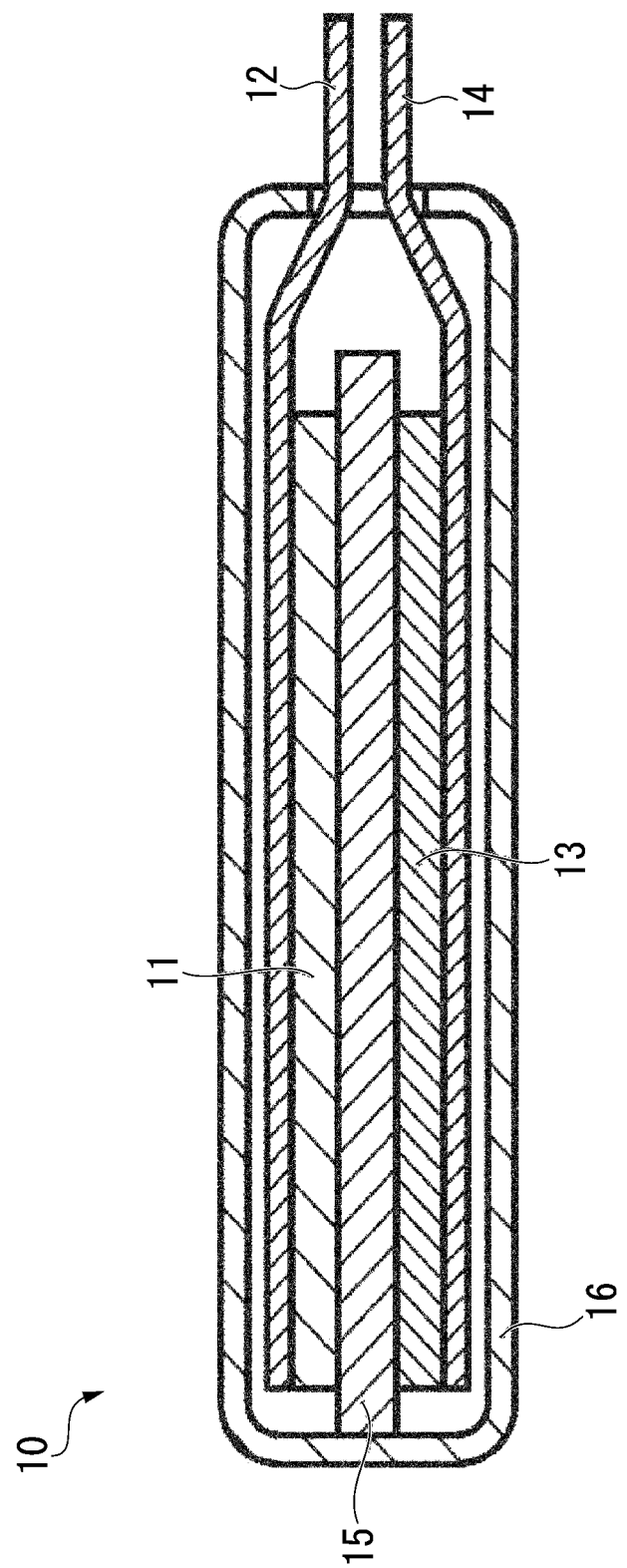

SYNTHETIC GRAPHITE MATERIAL, SYNTHETIC GRAPHITE MATERIAL PRODUCTION METHOD, NEGATIVE ELECTRODE FOR LITHIUM ION SECONDARY BATTERY, AND LITHIUM ION SECONDARY BATTERY

TECHNICAL FIELD

The present invention relates to a synthetic graphite material, a synthetic graphite material production method, a negative electrode for a lithium ion secondary battery, and a lithium ion secondary battery.

Priority is claimed on Japanese Patent Application No. 2019-004664, filed Jan. 15, 2019, the content of which is incorporated herein by reference.

BACKGROUND ART

Lithium ion secondary batteries are used for industrial purposes such as applications for automobiles and power storage of system infrastructures.

As a negative electrode material of a lithium ion secondary battery, graphite such as a synthetic graphite material has been used (see, for example, Patent Document 1).

Batteries used for applications for automobiles are used in a wide temperature range from a low temperature of 0° C. or lower to a high temperature of 60° C. or higher. However, a lithium ion secondary battery for which graphite is used as a negative electrode material has a disadvantage that lithium metal is likely to be deposited on the negative electrode at a low temperature of 0° C. or lower. In a case where lithium metal is deposited on the negative electrode, the amount of lithium ions that can move between the positive electrode and the negative electrode decreases. Therefore, the capacity of the lithium ion secondary battery is degraded.

It was previously reported that capacity degradation proceeds due to a difference in charge and discharge efficiency between a positive electrode and a negative electrode in a case where lithium metal is not deposited on the negative electrode (see, for example, Non Patent Documents 1 and 2).

CITATION LIST

Patent Document

[Patent Document 1]
Japanese Patent No. 5415684

Non Patent Document

[Non Patent Document 1]
The 51st Battery Symposium in Japan 3G15 (Nov. 8, 2010)
[Non Patent Document 2]
"Carbon Material for Negative Electrode for Lithium Ion Secondary Batteries" pp. 3 to 4 (published by Realize Corporation, Oct. 20, 1996)
[Non Patent Document 3]
Carbon, 1966 (No. 47), pp. 30 to 34
[Non Patent Document 4]
Carbon, 1969 (No. 50), pp. 20 to 25
[Non Patent Document 5]
Carbon, 1996 (No. 175), pp. 249 to 256

SUMMARY OF INVENTION

Technical Problem

In lithium ion batteries obtained by using graphite as a negative electrode material, an object thereof is to suppress capacity degradation due to charging and discharging of the batteries at a low temperature of 0° C. or lower. In particular, industrial lithium ion batteries used for applications for automobiles and power storage of system infrastructures are problematic because these batteries are used in a wide temperature range.

The present invention has been made in consideration of the above-described circumstances, and an object thereof is to provide a synthetic graphite material which is used as a material of a negative electrode for a lithium ion secondary battery to obtain a lithium ion secondary battery whose discharge capacity hardly deteriorates even if charge and discharge are repeated at a low temperature of 0° C. or lower.

Further, an object of the present invention is to provide a production method of the synthetic graphite material, a negative electrode for a lithium ion secondary battery which contains the synthetic graphite material, and a lithium ion secondary battery which is formed of the negative electrode and has a discharge capacity that is unlikely to be degraded even in a case where charging and discharging are repeated at a low temperature of 0° C. or lower.

Solution to Problem

[1] A synthetic graphite material, in which a size L (112) of a crystallite in a c-axis direction as calculated from a (112) diffraction line obtained by an X-ray wide angle diffraction method is in a range of 4 to 30 nm, a surface area based on a volume as calculated by a laser diffraction type particle size distribution measuring device is in a range of 0.22 to 1.70 $m^2/cm^3$, an oil absorption is in a range of 67 to 147 mL/100 g, a spectrum derived from carbon appearing in an electron spin resonance method as measured using an X band is in a range of 3200 to 3410 gauss, and ΔHpp, which is a line width of the spectrum as calculated from a first derivative spectrum of the spectrum at a temperature of 4.8K, is in a range of 41 to 69 gauss.

[2] A production method of the synthetic graphite material according to [1], including at least: a step of performing a coking treatment on a raw material oil composition by performing a delayed coking process to generate a coking coal composition; a step of pulverizing the coking coal composition to obtain coking coal powder; a step of performing a heat treatment on the coking coal powder to obtain graphite powder; and a step of pulverizing the graphite powder.

[3] The production method according to claim 2, further including: a step of bringing fluid catalytic cracking residual oil into contact with a catalyst layer (A) having an average pore diameter of 141 to 200 Å and a catalyst layer (B) having an average pore diameter of 65 to 110 Å in order, which are filled with a catalyst obtained by allowing an inorganic oxide carrier to carry one or more metals selected from Group 6A metals and Group 8 metals in the periodic table, to obtain hydrodesulfurized first heavy oil; and a step of mixing the first heavy oil with second heavy oil which has a sulfur content of 0.4% by mass or less and does not contain the first heavy oil to obtain a raw material oil composition, in which a content of the first heavy oil in the raw material oil composition is in a range of 15% to 80% by mass.

[4] A negative electrode for a lithium ion secondary battery including: the synthetic graphite material according to [1].

[5] A lithium ion secondary battery including: the negative electrode according to [4].

Advantageous Effects of Invention

The lithium ion secondary battery which has a negative electrode containing the synthetic graphite material of the present invention has a discharge capacity that is unlikely to be degraded even in a case where charging and discharging are repeated at a low temperature of 0° C. or lower.

BRIEF DESCRIPTION OF DRAWINGS

FIG. 1 is a schematic cross-sectional view showing an example of a lithium ion secondary battery according to the present embodiment.

DESCRIPTION OF EMBODIMENTS

Hereinafter, a synthetic graphite material, a synthetic graphite material production method, a negative electrode for a lithium ion secondary battery, and a lithium ion secondary battery of the present invention will be described in detail. Further, the present invention is not limited to embodiments described below.
[Synthetic Graphite Material]
The synthetic graphite material of the present embodiment satisfies all the following conditions (1) to (4).
(1) A size L (112) of a crystallite in a c-axis direction as calculated from a (112) diffraction line obtained by an X-ray wide angle diffraction method is in a range of 4 to 30 nm.
(2) The surface area based on the volume as calculated by a laser diffraction type particle size distribution measuring device is in a range of 0.22 to 1.70 $m^2/cm^3$.
(3) The oil absorption is in a range of 67 to 147 mL/100 g.
(4) A spectrum derived from carbon appearing in an electron spin resonance method as measured using an X band is in a range of 3200 to 3410 gauss, and ΔHpp, which is a line width of the spectrum as calculated from a first derivative spectrum of the spectrum at a temperature of 4.8K, is in a range of 41 to 69 gauss.

The size L (112) of a crystallite in the c-axis direction as calculated from the (112) diffraction line obtained by the X-ray wide angle diffraction method under the above-described condition (1) is the size L (112) measured and calculated in conformity with the "method of measuring lattice constant and crystallite size of synthetic graphite material" of JIS R 7651 (2007). Hereinafter, the size L (112) measured and calculated by this method may also be simply referred to as the size L (112).

The surface area based on the volume as calculated by the laser diffraction type particle size distribution measuring device under the above-described condition (2) is the surface area based on the volume calculated in conformity with "5.5 Calculation of surface area based on volume" in "Representation of results of particle size analysis—Part 2: Calculation of average particle sizes/diameters of moments from particle size distributions" of JIS Z 8819-2 (2001). Hereinafter, the surface area based on the volume measured and calculated by this method may also be simply referred to as the "surface area based on the volume".

The oil absorption under the above-described condition (3) is the oil absorption measured and calculated in conformity with "Oil absorption—Section 1: Refined linseed oil method" of JIS K 5101-13-1 (2004). Hereinafter, the oil absorption measured and calculated as described above may also be simply referred to as the "oil absorption".

In ESR measurement performed by putting the graphite material into a sample tube, vacuum-drawing the sample tube using a rotary pump, and enclosing the sample tube with He gas, ΔHpp in the condition (4) is an interval between two peaks formed of the maximum peak and the minimum peak in the first derivative spectrum of an absorption spectrum present in a range of 3200 to 3410 gauss (G) in a case where ΔHpp is measured using an X band (9.47 GHz) as the microwave under conditions of an intensity of 1 mW, a central magnetic field of 3360 G, a magnetic field modulation of 100 kHz, and a measurement temperature of 4.8 K. Hereinafter, ΔHpp measured as described above may also simply referred to as "ΔHpp (4.8K)".

As a result of intensive examination repeatedly conducted by the inventors by focusing on the size of a crystallite in the c-axis direction, the surface area based on the volume, the oil absorption, and ΔHpp (4.8K) of the synthetic graphite material, it was found that degradation of the discharge capacity in a case where charging and discharging are repeated at a temperature of 0° C. or lower can be suppressed by employing a lithium ion secondary battery having a negative electrode that contains a synthetic graphite material satisfying all the above-described conditions (1) to (4), thereby completing the present invention.

The synthetic graphite material satisfying the condition (1) that "the size L (112) is in a range of 4 to 30 nm" has crystals which are highly developed. The synthetic graphite material having a size L (112) of 4 to 30 nm has a graphitization degree suitable for a negative electrode of a lithium ion secondary battery. Since the reversible capacity increases as the size L (112) increases, the size L (112) of the synthetic graphite material is preferably 4 nm or greater.

In the synthetic graphite material having a size L (112) of less than 4 nm, the crystal structure is insufficiently developed. Therefore, the lithium ion secondary battery having a negative electrode that contains a synthetic graphite material having a size L (112) of less than 4 nm is not preferable from the viewpoint that the capacity is a small capacity (see, for example, Non Patent Document 2).

The above-described condition (2) is a value obtained by expressing the particle diameter and the distribution of the synthetic graphite material as a numerical value. The synthetic graphite material used for a negative electrode of a lithium ion secondary battery is typically in the form of particles (powder). The particle diameter (particle size) of the synthetic graphite material has a distribution. The relationship between the particle diameter and the distribution (particle size distribution) of the synthetic graphite material is expressed as a histogram (surface). The value obtained by expressing the particle size distribution of the synthetic graphite material as a numerical value (point) is the surface area based on the volume.

The synthetic graphite material satisfying the condition (2) that the "surface area based on the volume is in a range of 0.22 to 1.70 $m^2/cm^3$" has a particle size distribution that enables the material to be used as a negative electrode material for a lithium ion secondary battery.

In a case where the surface area based on the volume is less than 0.22 $m^2/cm^3$, the proportion of coarse powder particles having a large particle diameter increases, and thus a uniform negative electrode having a typical thickness (20 to 200 μm) may not be molded. Further, in a case where the surface area based on the volume is greater than 1.70 $m^2/cm^3$, the proportion of fine powder having a small particle diameter increases, and thus the influence of interaction such as adhesive force acting between particles may be stronger than the influence of the gravity. Therefore, in a case where a negative electrode of a lithium ion secondary battery is formed using a negative electrode mixture containing a synthetic graphite material, a homogeneous negative electrode mixture is unlikely to be obtained, which is not suitable for practical use.

The above-described condition (3) that the "oil absorption is in a range of 67 to 147 mL/100 g" is an index showing the number of particles per unit weight in a case where the surface area based on the volume of the above-described condition (2) is satisfied.

The particle size distribution is expressed as a histogram of the particle diameter (μm) and the frequency (%), but the frequency does not include any information related to the number of particles per unit weight. Similarly, the surface area based on the volume acquired from the particle size distribution does not include any information related to the number of particles per unit weight.

In a case where the oil absorption of the synthetic graphite material is 147 mL/100 g or less, the lithium ion secondary battery having a negative electrode containing the synthetic graphite material is formed such that lithium metal is unlikely to be deposited on the negative electrode even in a case where charge and discharge cycles are repeated at a low temperature of 0° C. or less and the discharge capacity is unlikely to be degraded. Further, in a case where the oil absorption of the synthetic graphite material is 67 mL/100 g or greater, since the number of particles per unit weight is large, charge acceptability can be sufficiently obtained even at a low temperature of 0° C. or lower. Therefore, the charge and discharge efficiency of the lithium secondary battery having a negative electrode containing the synthetic graphite material is remarkably improved. Therefore, the lithium ion secondary battery having a negative electrode that contains the synthetic graphite material having an oil absorption of 67 mL/100 g or greater is formed such that the capacity degradation due to repeated charge and discharge cycles at a temperature of 0° C. or lower is sufficiently suppressed in practical use.

On the contrary, in the lithium secondary battery having a negative electrode that contains the synthetic graphite material having an oil absorption of greater than 147 mL/100 g, in a case where the battery is charged and discharged at a low temperature of 0° C. or lower, the discharge capacity is rapidly degraded for each cycle due to deposition of lithium metal during charging of the battery at the negative electrode. More specifically, in the synthetic graphite material having an oil absorption of greater than 147 mL/100 g, peeling pulverizing occurs during the production preferentially than splitting pulverizing of graphite powder, and the graphite powder is pulverized while the particle shape is sliced, and thus the number of particles per unit weight increases. Therefore, in the negative electrode containing the synthetic graphite material, the void volume (a region where the electrolyte is present) between the adjacent particles of the synthetic graphite material is small, edges serving as entrances for lithium ions in the particles of the synthetic graphite material in which splitting pulverizing of graphite powder occurs are insufficient, and thus the ion conductivity of the electrolytic solution is insufficient. As a result, the cathodic polarization at the negative electrode due to charging of the battery at a low temperature of 0° C. or lower is likely to increase, lithium metal is likely to be deposited, and thus the discharge capacity is likely to be degraded due to the repeated charge and discharge cycles.

In the present specification, the splitting pulverizing of graphite powder indicates pulverizing accompanied by breakage of chemical bonds of graphite, which is pulverizing in which cracks occur substantially perpendicular to the plane direction of graphite.

Further, the peeling pulverizing of graphite powder indicates pulverizing without breakage of chemical bonds of graphite, which is pulverizing in which peeling occurs substantially parallel to the plane direction of graphite.

In the lithium ion secondary battery having a negative electrode that contains the synthetic graphite material satisfying the condition (4) that "a spectrum derived from carbon appearing in an electron spin resonance method as measured using an X band is in a range of 3200 to 3410 gauss, and $\Delta Hpp$, which is a line width of the spectrum as calculated from a first derivative spectrum of the spectrum at a temperature of 4.8K, is in a range of 41 to 69 gauss", the discharge capacity is unlikely to be degraded even in a case where the charge and discharge cycles are repeated at a low temperature of 0° C. or lower.

Here, $\Delta Hpp$ (4.8K) is an index a large number of states of edge surfaces exposed to the surface of each particle of the graphite material. The reason for this will be described in detail below.

ESR measurement is spectroscopic analysis performed by observing the transition between levels that occurs in a case where unpaired electrons are placed in a magnetic field. In a case where a magnetic field is applied to a substance having unpaired electrons, the energy level of the substance is divided into two levels by the Zeeman effect. The measurement is performed by sweeping the magnetic field under a microwave irradiation condition, and $\Delta E$ which is an energy split interval increases as the applied magnetic field increases. Resonance absorption is observed in a case where $\Delta E$ is equal to the energy of the applied microwave, and the amount of the energy to be absorbed during this resonance absorption is detected to obtain the ESR spectrum. The ESR spectrum is typically obtained from a first derivative spectrum and becomes an absorption spectrum in a case of integration once, and the signal strength is obtained in a case of integration twice. The magnitude of the signal strength here is an index showing the magnitude of the density of unpaired electrons in the substance. Two kinds of unpaired electrons, which are localized electrons and conduction electrons, are present in the crystals of the graphite material. That is, in the ESR measurement of the graphite material, the sum of the resonance absorption of microwaves by these two kinds of unpaired electrons is observed as the ESR spectrum. The signal strength obtained by integrating the obtained ESR spectrum twice is an index showing the magnitude of the density of the unpaired electrons, which is the sum of the density of conduction electrons and the density of localized electrons. Here, the conduction electrons in the graphite material are unpaired $\pi$ electrons spontaneously expressed in relation to the number of rings forming the hexagonal network planes and the bonding form thereof and can freely move in the hexagonal network planes (Non Patent Documents 3 and 4).

Meanwhile, the localized electrons are localized electrons present on the edge surfaces of the hexagonal network plane laminate, which are immovable electrons. Further, while the signal strength of resonance absorption by conduction electrons is not temperature-dependent, the signal strength of resonance absorption by localized electrons increases in inverse proportion to a measurement temperature T. For example, it has been reported that in a case where the measurement is performed by gradually lowering the measurement temperature from 300K in the ESR measurement of the carbon material in a temperature range of $4.2K \leq T \leq 300K$, absorption of microwaves by localized electrons begins to be observed in the vicinity of 50K, and the signal strength due to localized electrons increases in inverse proportion to the measurement temperature T, in a low temperature region of 50 K or lower (Non Patent Document 5).

The ESR spectrum of the graphite material is a spectrum obtained by averaging the absorption spectra of different resonance magnetic fields. Therefore, in a case where a plurality of unpaired electrons in different states are present, that is, a plurality of resonance absorptions occur in different magnetic fields, the ESR spectrum is apparently changed to a broad spectrum and the line width ΔHpp increases. In particular, in a low temperature region where the contribution of localized electrons is large, in a case where ΔHpp is large, it is possible to predict that a plurality of localized electron states are present in the graphite material. The presence of a plurality of localized electron states can be rephrased as the presence of a plurality of edge surface states in which the localized electrons are present. As described above, it can be said that ΔHpp is an index showing a large number of states of the edge surfaces exposed to the surface of each particle of the graphite material in a low temperature region of 50 K or lower.

The synthetic graphite material of the present embodiment satisfies the above-described condition (4). As described above, ΔHpp, which is the line width of the ESR spectrum at a measurement temperature of 4.8 K, is an index showing a large number of states of localized electrons. The number of states of localized electrons increases as the ΔHpp increases, and thus a plurality of states of edge surfaces are present. On the contrary, the number of states of localized electrons decreases as the ΔHpp decreases, and thus the number of states of edge surfaces is small.

In particular, in a case where highly crystalline graphite powder in which the size L (112) of the crystallite in the above-described condition (1) has reached 4 to 30 nm is pulverized until the surface area based on the volume in the above-described condition (2) reaches 0.22 to 1.70 $m^2/cm^3$, as described above, peeling pulverizing occurs preferentially than splitting pulverizing. The peeling pulverizing is pulverizing that occurs in a case where parallel shear stress is applied to a basal plane of a crystallite constituting graphite particles. Therefore, between two fracture surfaces in two directions (a fracture surface on an edge side and a fracture surface on a basal plane side), the regularity of the three-dimensional arrangement of carbon atoms is greatly reduced particularly in the fracture surface on the edge side, and the ΔHpp (4.8 K) after the pulverizing increases because various localized electron states appear. Meanwhile, the splitting pulverizing is pulverizing that occurs in a case where vertical mechanical energy is applied to a basal plane of a crystallites constituting graphite particles. Therefore, the regularity of the three-dimensional arrangement of carbon atoms present in the fracture surface on the edge side is not reduced as compared with the case of the peeling pulverizing. Accordingly, it can be considered that ΔHpp of the graphite particles obtained by the production method according to a first invention is an index showing the ratio between the peeling pulverizing and the splitting pulverizing. That is, only in a case of the synthetic graphite obtained by the production method, the probability of occurrence of the splitting pulverizing is higher than the probability of occurrence of the peeling pulverizing as ΔHpp decreases.

Further, ΔHpp (4.8K) of typical graphite particles pulverized until the oil absorption reaches 67 to 147 mL/100 g is usually 70 gauss or greater. Meanwhile, it can be considered that the synthetic graphite material described in the first invention of the present application is a material in which the proportion of split-pulverized particles is higher than that of a typical graphite material because ΔHpp (4.8K) is 69 cm-1 or less. Such a synthetic graphite material can be produced by combining two controls, that is, (a) using fluid catalytic cracking residual oil which has been treated by a specific catalyst system as a raw material oil composition that is a raw material and (b) controlling a difference between the surface area based on the volume of the coking coal composition after being pulverized (hereinafter, also referred to as the surface area based on the volume of the raw material) and the surface area based on the volume of the heat-treated graphite powder after being pulverized (hereinafter, also referred to as the surface area based on the volume of the graphite).

In a case where the synthetic graphite material of the present embodiment obtained by a production method including at least a step of performing a coking treatment on a raw material oil composition by performing a delayed coking process so that the coking coal composition is pulverized to obtain powder of the coking coal composition, a step of performing a heat treatment on the powder of the coking coal composition to obtain graphite powder, and a step of pulverizing the graphite powder which has been subjected to a heat treatment (the synthetic graphite material obtained by combining two controls described above) is compared to synthetic graphite obtained without two controls described above, graphite powder having a small ΔHpp (4.8K) is obtained even in a case where the difference of the item (b) is large (even in a case where the pulverizing is carried out until the surface area based on the graphite is larger than the surface area based on the volume of the raw material). That is, it can be understood that the probability that the graphite powder after being subjected to the heat treatment is split-pulverized is increased by the two controls described above. Here, the surface area based on the volume of the graphite is the same as the surface area based on the volume described in the condition (2) according to the present embodiment. Therefore, the surface area based on the graphite may be set to be in a range of the particle size distribution of the synthetic graphite typically used as a synthetic graphite material for a negative electrode of a lithium ion secondary battery, as described in the numerical range of the above-described condition (2). Further, the surface area based on the raw material may be set to a value larger than the target surface area based on the volume of the graphite in order to pulverize the graphite powder after the heat treatment. Specifically, the surface area based on the volume of the raw material is required to be set while the oil absorption and ΔHpp (4.8K) of the synthetic graphite material obtained by pulverizing the graphite powder after the heat treatment are set to be in the ranges of the oil absorption of the condition (3) and ΔHpp (4.8K) of the condition (4) each time, and a range of 0.22 to 1.70 $m^2/cm^3$ is a representative example.

By combining the two controls described above, the oil absorption and ΔvG can be freely controlled even in the range of the surface area based on the volume of the condition (2). In a case where the coking coal composition and the graphite powder after the heat treatment are pulverized, the difference between the surface area based on the volume of the raw material and the surface area based on the volume of the graphite can be controlled by controlling each pulverizing condition (such as operating conditions of a pulverizer). In the synthetic graphite material obtained by controlling the condition, ΔHpp increases monotonically as the oil absorption increases. However, the inventor found that the relationship (the function of oil absorption with respect to ΔHpp (4.8K)) strongly depends on the raw material oil composition (using fluid catalytic cracking residual oil treated by a particular catalyst system). Therefore, the oil absorption and ΔHpp (4.8K) of the synthetic graphite material obtained by the production method can be freely controlled. However, in order to obtain a graphite material in which lithium metal is unlikely to be deposited even in a case where charging and discharging of the battery are repeated at a temperature of 0° C. or lower according to the production method, it is necessary to satisfy the above-described condition (4) that "ΔHpp (4.8K) is in a range of 41 to 69 gauss" and the above-described condition (3) that "the oil absorption is in a range of 67 to 147 ml/100 g". The reason for this will be described in detail below.

As described above, only in the synthetic graphite obtained by the production method, it can be considered that the splitting pulverizing occurs preferentially than the peeling pulverizing as ΔHpp (4.8 K) decreases. Therefore, the proportion of edges present on the surface of each particle is extremely high in a case where ΔHpp (4.8K) is 41 gauss or less, and the cycle degradation accompanied by a decrease in charge and discharge efficiency of the negative electrode is significant in a case where such a synthetic graphite material is used in the negative electrode, which is not preferable. The cycle degradation is caused by a decrease in charge and discharge efficiency of the negative electrode and an increase in difference between the charge and discharge efficiency of the negative electrode and the charge and discharge efficiency of the positive electrode because the proportion of edge surfaces in the surface of each graphite particle increases. The degradation mechanism in a case where charging and discharging of the battery are repeated at a temperature 0° C. or lower is exactly the same as the degradation mechanism in a case where charging and discharging of the battery are repeated at a temperature 0° C. or higher. On the contrary, in a case where ΔHpp (4.8K) is 69 gauss or greater, the peeling pulverizing occurs preferentially than the splitting pulverizing, and thus the three-dimensional arrangement of carbon atoms is disturbed as the reversible intercalation reaction of lithium ions is inhibited (steric hindrance occurs) (various states of localized electrons generated by the cleavage of chemical bonds are present) in the edge surfaces present on the surface of each particle after the pulverizing, which is not preferable. In the lithium ion secondary battery in which such a graphite material is used in the negative electrode, since the resistance of the negative electrode is high, lithium metal is deposited on the negative electrode and cycle degradation is significant in a case where charging and discharging of the battery are repeated at a temperature of 0° C.

In addition, as described above, the oil absorption is an index indicating the number of particles per unit weight. Therefore, it can be considered that in the graphite material having an oil absorption of 67 mL/100 g or less, the number of particles per unit weight is extremely small. In the lithium ion secondary battery in which such a synthetic graphite material is used in the negative electrode, the resistance particularly in a case where the battery is charged at a low temperature of 0° C. or lower is high (the charge acceptability decreases), and lithium metal is likely to be deposited on the negative electrode, which is not preferable. On the contrary, since the number of particles per unit weight is extremely large in a case where the oil absorption is 147 mL/100 g or greater, the volume of voids formed between adjacent particles inevitably decreases in a case where the synthetic graphite material is used to form the negative electrode of the lithium ion secondary battery. Further, the ion conductivity of the electrolyte present in the negative electrode increases as the void volume of the negative electrode increases, and the ion conductivity of the electrolyte decreases as the temperature decreases. Therefore, in the lithium ion secondary battery in which the graphite material having an oil absorption of 147 mL/100 g or greater is used in the negative electrode, the resistance of the negative electrode is particularly high at a low temperature of 0° C. or lower, and the cycle degradation of the discharge capacity is significant in a case where charging and discharging of the battery are repeated at a low temperature of 0° C. or lower, which is not preferable.

Therefore, as described above, since the lithium ion secondary battery having a negative electrode that contains the synthetic graphite material of the present embodiment has a small oil absorption and a small ΔHpp (4.8K) compared to the lithium ion secondary battery having a negative electrode containing the synthetic graphite material that does not satisfy the above-described conditions (3) and (4), the void volume between adjacent particles is relatively large, the ion conductivity of the electrolyte is ensured even at low temperatures, and edge surfaces on which lithium metal is unlikely to be deposited even in a case where charging and discharging of the battery are repeated at a low temperature of 0° C. or lower is ensured within a range where the life characteristics are not significantly affected. Therefore, the lithium ion secondary battery having a negative electrode containing the synthetic graphite material of the present embodiment can suppress degradation of the discharge capacity even in a case where charging and discharging of the battery are repeated at a low temperature of 0° C. or lower.

[Synthetic Graphite Material Production Method]

The synthetic graphite material of the present embodiment can be produced, for example, according to a production method described below.

That is, the production method includes a step of performing a coking treatment on a raw material oil composition by performing a delayed coking process to generate a coking coal composition; a step of pulverizing the coking coal composition to obtain coking coal powder; a step of performing a heat treatment on the coking coal powder to obtain graphite powder; and a step of pulverizing the graphite powder.

(Step of Performing Coking Treatment on Raw Material Oil Composition to Generate Coking Coal Composition)

As the raw material oil composition used for the synthetic graphite material production method of the present embodiment, a raw material oil composition containing first heavy oil and second heavy oil described below is preferable.

<First Heavy Oil>

The first heavy oil is obtained by performing a predetermined hydrodesulfurization treatment on fluid catalytic cracking residual oil having a sulfur content of preferably 0.5% by mass or greater and less than 1.5% by mass and an aroma component content of preferably 50% by mass or greater and less than 90% by mass. The upper limit of the sulfur content in the fluid catalytic cracking residual oil is still more preferably 1.0% by mass. In a case where the sulfur content in the fluid catalytic cracking residual oil is greater than 1.5% by mass, it may be difficult to desulfurize a polycyclic aroma component, which is a hardly desulfurizing component, even in a case where hydrodesulfurization is carried out using the catalyst system described below.

Further, the sulfur content can be measured based on the method described in JIS M 8813-Appendix 2: 2006. Further, the lower limit of the content of the aroma component in the fluid catalytic cracking residual oil is still more preferably 70% by mass.

Further, the content of the aroma component, and the contents of the saturated component and the asphaltene component described below can be measured by a TLC-FID method. In the TLC-FID method, a sample is divided into four components, which are a saturated component, an aroma component, a resin component, and an asphaltene component by thin layer chromatography (TLC), each component is detected by a flame ionization detector (FID), and the composition component value is obtained based on the percentage of the amount of each component with respect to the amount of all components. First, 0.2 g±0.01 g of the sample is dissolved in 10 ml of toluene to prepare a sample solution. 1 μl of the sample solution is spotted on a lower end (at a 0.5 cm position of the rod holder) of a silica gel rod-like thin layer (chroma rod) that has been preheated using a microsyringe, and dried with a dryer or the like. Next, the sample is developed with a developing solvent using the 10 microrods as one set. As the developing solvent, hexane is used in a first developing tank, hexane/toluene (volume ratio of 20:80) is used in a second developing tank, and dichloromethane/methanol (volume ratio of 95:5) is used in a third developing tank. The saturated component is eluted and developed in the first developing tank using hexane as the solvent. After the first development, the aroma component is eluted and developed in the second developing tank. After the first development and the second development, the asphaltene component is eluted and developed in a third developing tank using dichloromethane/methanol as the solvent. A chroma rod after the development is set in a measuring instrument (for example, "IATROSCAN MK-5" (trade name), manufactured by Daitron Co., Ltd. (currently Mitsubishi Chemical Yatron)), and the amount of each component is measured by a flame ionization detector (FID). The amount of all components can be obtained by summing the amount of each component.

The heavy oil used as a raw material of the fluid catalytic cracking residual oil is not particularly limited as long as the sulfur content and the aroma component satisfy the above-described conditions using the fluid catalytic cracking. As the heavy oil, hydrocarbon oil having a density of 0.8 g/cm$^3$ or greater at 15° C. is preferable, and examples thereof include atmospheric residual oil, vacuum residual oil, shale oil, tar sands bitumen, orinoco tar, coal-liquefied oil, and heavy oil obtained by hydrotreating any of these oils. Further, the density is a value measured in conformity with the method described in JIS K 2249-1: 2011.

The atmospheric residual oil is a fraction obtained in a case where crude oil is fed to an atmospheric distillation unit and heated under the atmospheric pressure so as to be divided into gas/LPG, a gasoline fraction, a kerosene fraction, a gas oil fraction, and atmospheric residual oil based on the boiling points of the fractions to be contained, and the atmospheric residual oil is a fraction having the highest boiling point. The heating temperature varies depending on the production area of crude oil and the like and is not limited as long as the oil can be fractionated into these fractions, and for example, crude oil is heated at 320° C. The vacuum residual oil (VR) is bottom oil of a vacuum distillation unit obtained by feeding crude oil to an atmospheric distillation unit to obtain gas, gas oil, and atmospheric residual oil and then the atmospheric residual oil changing in a heating furnace outlet temperature range of 320° C. to 360° C. under reduced pressure of 1.3 to 4.0 kPa (10 to 30 Torr).

As raw materials for the fluid catalytic cracking residual oil, gas oil such as straight-run gas oil, vacuum gas oil, desulfurized gas oil, or desulfurized vacuum gas oil may be contained in addition to the heavy oil. Among these, vacuum gas oil, for example, desulfurized vacuum gas oil is particularly preferable. It is preferable that the vacuum gas oil is desulfurized vacuum gas oil (preferably having a sulfur content is 500 mass ppm or less and a density of 0.8/cm$^3$ or greater at 15° C.) obtained by directly desulfurizing atmospheric residual oil.

The conditions for fluid catalytic cracking are not particularly limited as long as the sulfur content and the aroma component can satisfy the above-described conditions. For example, conditions set such that the reaction temperature is in a range of 480° C. to 560° C., the total pressure is in a range of 0.1 to 0.3 MPa, the ratio of the catalyst to the oil (catalyst/oil) is in a range of 1 to 20, and the contact time is in a range of 1 to 10 seconds. Examples of the catalyst used for fluid catalytic cracking include a zeolite catalyst, a silica-alumina catalyst, and a catalyst in which a noble metal such as platinum is carried by these catalysts.

<Hydrodesulfurization to Obtain First Heavy Oil>

The first heavy oil is obtained by performing predetermined hydrodesulfurization on the above-described fluid catalytic cracking residual oil. As the hydrodesulfurization system, for example, a catalyst system in conformity with Japanese Unexamined Patent Application, First Publication No. 2013-209528 or Japanese Unexamined Patent Application, First Publication No. 2013-209529 may be used. Specifically, desulfurized fluid catalytic cracking residual oil is obtained by performing hydrodesulfurization using two catalyst layers obtained by bringing fluid catalytic cracking residual oil into contact with a catalyst layer (A) having an average pore diameter of 140 to 200 Å and a catalyst layer (B) having an average pore diameter of 80 to 110 Å in order, which are filled with a catalyst obtained by allowing an inorganic oxide carrier to carry one or more metals selected from Group 6A metals and Group 8 metals in the periodic table or using three catalyst layers obtained by further bringing the fluid catalytic cracking residual oil into contact with a catalyst layer (C) having an average pore diameter of 65 to 79 Å after the fluid catalytic cracking residual oil comes into contact with the catalyst layer (A) and the catalyst layer (B), in some cases. The desulfurization catalyst of heavy oil used for hydrodesulfurization in a production method of the related art typically has a pore diameter of approximately 80 Å, the polycyclic aroma component has a large steric hindrance due to the molecular size thereof, and the frequency of molecules entering pores of the catalyst is decreased so that the desulfurization reaction is not sufficiently performed. Therefore, a high desulfurization rate cannot be obtained. In the present embodiment, a large amount of polycyclic aroma component can be removed from the fluid catalytic cracking residual oil by using a hydrodesulfurization system described below, and thus the desulfurization rate can be increased. Therefore, bicyclic or tricyclic aroma components which are considered to be preferable for formation a satisfactory bulk mesophase can be sufficiently obtained by using the fluid catalytic cracking residual oil treated by the hydrodesulfurization system.

In the hydrodesulfurization system, for example, a fixed bed reaction unit may be filled with a predetermined catalyst to form two catalyst layers which are the catalyst layer (A)

and the catalyst layer (B) described below or to form three catalyst layers by forming a catalyst layer (C) after formation of the catalyst layer (A) and the catalyst layer (B). In this case, hydrodesulfurization is carried out by sequentially bringing fluid catalytic cracking residual oil into contact with the catalyst layers (A) and (B) or the catalyst layers (A) to (C).

First, a catalyst A used for the catalyst layer (A) will be described. Examples of the inorganic oxide carrier of the catalyst A include carriers containing alumina, silica alumina, alumina boria, alumina zirconia, alumina titania, or a combination thereof in an amount of 85% by mass or greater of the carriers as a main component. Among these, alumina and silica alumina are preferable. Further, these carriers may contain 0.5 to 5% by mass of phosphorus with respect to the amount of the carrier. It is preferable that the carrier contains phosphorus from the viewpoint of improving the desulfurization activity.

It is important that the average pore diameter of the catalyst A is in a range of 140 to 200 Å and preferably in a range of 150 to 180 Å. By nuclear hydrogenating a tricyclic or higher (particularly pentacyclic or hexacyclic) polycyclic sulfur compound with the catalyst A and disrupting the three-dimensional structure of the flat plate-like bulky polycyclic aroma, the catalyst layer in the subsequent stage having small pores is easily desulfurized. In a case where the average pore diameter of the catalyst A is less than 140 Å, the polycyclic sulfur compound cannot be sufficiently diffused into the catalyst pores, and thus the effect of nuclear hydrogenation cannot be sufficiently obtained. Further, in a case where the average pore diameter thereof is greater than 200 Å, the filling density of the catalyst decreases, and thus the effect of nuclear hydrogenation cannot be sufficiently obtained. In the present embodiment, the average pore diameter of the catalyst is a value acquired by a mercury press-in method or a BJH method.

As the Group 6A metal carried by the carrier, molybdenum or tungsten is used. The amount of the metal to be carried by the catalyst is preferably in a range of 3 to 22% by mass with respect to the amount of the catalyst based on the oxide thereof. The amount thereof is more preferably in a range of 8 to 15% by mass in a case of two layers, and the amount thereof is more preferably in a range of 8 to 20% by mass in a case of three layers. In a case where the amount thereof is less than 3% by mass, there is a tendency that desulfurization and denitrification activity cannot be sufficiently obtained. Further, in a case where the amount thereof is greater than 22% by mass, there is a tendency that the metals are aggregated and the desulfurization activity decreases. Further, as the Group 8 metal, cobalt and/or nickel is used.

The amount of the metal to be carried by the catalyst is preferably in a range of 0.2 to 12% by mass with respect to the amount of the catalyst based on the oxide thereof.

The amount thereof is more preferably in a range of 1 to 10% by mass in a case of two layers, and the amount thereof is more preferably in a range of 1 to 12% by mass in a case of three layers.

The proportion of the catalyst layer (A) in all layers filled with the catalyst is preferably in a range of 10% to 30% by volume and more preferably in a range of 15% to 25% by volume, regardless of whether the number of all layers filled with the catalyst is 2 or 3. In a case where the proportion thereof is less than 10% by volume, the effect of the nuclear hydrogenation cannot be sufficiently obtained. Further, in a case where the proportion thereof is greater than 30% by volume, the filling amount of the catalyst in the subsequent stage decreases, and thus the desulfurization activity in the subsequent stage is insufficient.

Next, the catalyst B used for the catalyst layer (B) will be described. Examples of the inorganic oxide carrier of the catalyst B include carriers containing alumina, silica alumina, alumina boria, alumina zirconia, alumina titania, or a combination thereof in an amount of 85% by mass or greater of the carriers as a main component. In a case of two layers, alumina boria, silica alumina, and alumina titania are preferable, and alumina boria and alumina titania are particularly preferable. In a case of three layers, alumina and silica alumina are preferable. Further, these carriers may contain 0.5 to 5% by mass of phosphorus with respect to the amount of the carrier. It is preferable that the carrier contains phosphorus from the viewpoint of improving the desulfurization activity.

It is important that the average pore diameter of the catalyst B is in a range of 65 to 110 Å, preferably in a range of 70 to 100 Å, and still more preferably in a range of 80 to 95 Å in the case of two layers. It is important that the average pore diameter of the catalyst B is in a range of 80 to 110 Å and preferably in a range of 80 to 100 Å in the case of three layers. A polycyclic sulfur compound which has been nuclear-hydrogenated with the catalyst layer (A) so that the flat plate-like bulky three-dimensional structure is disrupted is desulfurized by the catalyst B. In a case where the average pore diameter of the catalyst B is less than the above-described lower limit, these sulfur compounds cannot be sufficiently diffused into the pores of the catalyst, and the effect of hydrogenation cannot be sufficiently obtained. Further, in a case where the average pore diameter thereof is greater than 110 Å, the filling density of the catalyst decreases, and thus the effect of desulfurization cannot be obtained.

As the Group 6A metal carried by the carrier, molybdenum or tungsten is used. The amount of the metal to be carried by the catalyst is preferably in a range of 15 to 22% by mass with respect to the amount of the catalyst based on the oxide thereof. The amount thereof is more preferably in a range of 17 to 20% by mass in a case of two layers, and the amount thereof is more preferably in a range of 17 to 22% by mass in a case of three layers. In a case where the amount thereof is less than 15% by mass, there is a tendency that desulfurization activity cannot be sufficiently obtained. Further, in a case where the amount thereof is greater than 22% by mass, there is a tendency that the metals are aggregated and the desulfurization activity decreases. Further, as the Group 8 metal, cobalt and/or nickel is used. The amount of the metal to be carried by the catalyst is preferably in a range of 0.2 to 10% by mass and more preferably in a range of 1% to 8% by mass with respect to the amount of the catalyst based on the oxide thereof in a case of two layers, and the amount of the metal to be carried by the catalyst is preferably in a range of 0.2 to 12% by mass and more preferably in a range of 1% to 12% by mass with respect to the amount of the catalyst based on the oxide thereof in a case of three layers.

The proportion of the catalyst layer (B) in all layers filled with the catalyst is preferably in a range of 70% to 90% by volume and more preferably in a range of 75% to 85% by volume in a case where the number of all layers filled with the catalyst is 2. The proportion thereof is preferably in a range of 40% to 80% by volume and more preferably in a range of 40% to 60% by volume in a case where the number of all layers filled with the catalyst is 3. In a case where the proportion thereof is less than the above-described lower limit or greater than the above-described upper limit, the desulfurization effect cannot be sufficiently obtained.

Next, the catalyst C used for the catalyst layer (C) will be described. Examples of the inorganic oxide carrier of the catalyst C include carriers containing alumina, silica alumina, alumina boria, alumina zirconia, alumina titania, or a combination thereof in an amount of 85% by mass or greater of the carriers as a main component. Among these, alumina and silica alumina are preferable. Further, these carriers may contain 0.5 to 5% by mass of phosphorus with respect to the amount of the carrier. It is preferable that the carrier contains phosphorus from the viewpoint of improving the desulfurization activity.

It is important that the average pore diameter of the catalyst C is in a range of 65 to 79 Å and preferably in a range of 70 to 79 Å. Since CLO also contains relatively small sulfur compounds which are smaller than or equal to bicyclic aroma, in a case where desulfurization with respect to those compounds is insufficient only with the catalyst layers (A) and (B), desulfurization can be efficiently carried out by the catalyst C. In a case where the average pore diameter of the catalyst C is less than 65 Å, these sulfur compounds cannot be sufficiently diffused into the pores of the catalyst, and the effect of hydrogenation cannot be sufficiently obtained. Further, in a case where the average pore diameter thereof is greater than 79 Å, the filling density of the catalyst decreases, and thus the effect of desulfurization cannot be obtained.

As the Group 6A metal carried by the carrier, molybdenum or tungsten is used. The amount of the metal to be carried by the catalyst is preferably in a range of 15 to 22% by mass and more preferably in a range of 17% to 22% by mass with respect to the amount of the catalyst based on the oxide thereof. In a case where the amount thereof is less than 15% by mass, there is a tendency that desulfurization cannot be sufficiently obtained. Further, in a case where the amount thereof is greater than 22% by mass, there is a tendency that the metals are aggregated and the desulfurization activity decreases. Further, as the Group 8 metal, cobalt and/or nickel is used. The amount of the metal to be carried by the catalyst is preferably in a range of 0.2 to 12% by mass and more preferably in a range of 1% to 12% by mass with respect to the amount of the catalyst based on the oxide thereof.

The proportion of the catalyst layer (C) in all layers filled with the catalyst is preferably in a range of 10% to 40% by volume, more preferably in a range of 20% to 40% by volume, and still more preferably in a range of 20% to 35% by volume. In a case where the proportion thereof is less than 10% by volume or greater than 40% by volume, the effect of desulfurization cannot be sufficiently obtained.

Desired hydrodesulfurization can be carried out by bringing fluid catalytic cracking heavy residual oil into contact with the catalyst layer (A) and the catalyst layer (B) in order or with the catalyst layer (A), the catalyst layer (B), and the catalyst layer (C) in order. Specifically, first, in the catalyst layer (A), a high degree of nuclear hydrogenation of a polycyclic sulfur compound in the fluid catalytic cracking heavy residual oil is performed to reduce the number of rings of the polycyclic sulfur compound (for example, 5 or 6 aromatic rings are reduced to 3 or 4 aromatic rings). Next, in the catalyst layer (B), the polycyclic sulfur compound having a reduced number of rings in the catalyst layer (A) is desulfurized (for example, a tricyclic or tetracyclic sulfur compound is desulfurized). Finally, in the catalyst layer (C), the polycyclic sulfur compound is desulfurized by hydrogenating the sulfur compound that has not been able to be desulfurized in the catalyst layer (B). As described above, higher desulfurization performance can be obtained by sequentially disposing catalysts in a descending order of the average pore diameter from the upstream direction and filling layers with these catalyst at optimum ratios.

In the disposition of the catalysts, in the case of two layers, for example, the catalyst layer (A) may contain molybdenum, cobalt, and nickel, and the catalyst layer (B) may contain molybdenum and nickel. In this case, the proportion of the catalyst layer (A) in all layers is preferably in a range of 50% to 90% by volume. In a case where the proportion thereof is less than 50% by volume, the desulfurization activity is improved, but the hydrogen consumption is likely to increase. Further, in a case where the proportion thereof is greater than 90% by volume, the desulfurization activity is likely to decrease even though the hydrogen consumption decreases. Further, in the case of three layers, it is preferable that catalysts are disposed such that the sum obtained by adding the product of the proportion (0 to 1.0) of each catalyst layer in all layers filled with the catalyst and the average pore diameter (Å) of the catalyst in the layer reaches 90 or greater.

Σ[(proportion of each layer in all layers filled with catalyst)×(average pore diameter)]≥90

The sum obtained by adding the product of the proportion of each catalyst layer in all layers filled with the catalyst and the average pore diameter of the catalyst in the layer represents the number of active sites that contribute to desulfurization in a simplified manner. From the viewpoint that the appropriate effect of desulfurization of the polycyclic sulfur compound in the catalyst layer (B) can be obtained by the appropriate effect of nuclear hydrogenation of the polycyclic sulfur compound in the catalyst layer (A), and the effect of desulfurization of the bicyclic or lower cyclic sulfur compound which is relatively small can be sufficiently obtained in the catalyst layer (C), the above sum is more preferably 95 or greater and still more preferably 98 or greater. Further, the upper limit thereof is preferably 125 or less, more preferably 120 or less, and still more preferably 115 or less in order to prevent degradation of the desulfurization performance due to an excessive proportion of the catalyst layer (A) and a decrease in the proportions of the catalyst layers (B) and (C).

In the catalysts used for the catalyst layers (A) to (C), the method of allowing the metal to be carried by the carrier is not particularly limited, but an impregnation method can be preferably used.

In a case where the catalyst of the hydrodesulfurization system as described above is used as a hydrotreating catalyst of the fluid catalytic cracking residual oil, a pre-sulfurization treatment is performed before the fluid catalytic cracking residual oil is added in order to develop the activity. The pre-sulfurization treatment is performed by circulating a sulfurizing agent under conditions of a hydrogen partial pressure of 2 MPa or greater and a maximum temperature, after the temperature rise, of 240° C. to 380° C. and preferably 250° C. to 350° C. In a case where the hydrogen partial pressure is less than 2 MPa, the degree of sulfurization of molybdenum or tungsten tends to be low, and the desulfurization activity and the denitrification activity tend to be low. Further, in a case where the maximum temperature during the pre-sulfurization is lower than 240° C., the degree of sulfurization of molybdenum or tungsten tends to be low. Further, in a case where the maximum temperature is higher than 380° C., coking occurs and thus the desulfurization activity tends to decrease. Examples of the sulfurizing agent used in the pre-sulfurization treatment include hydrogen sulfide, carbon disulfide, and dimethyl disulfide used for hydrotreating in refineries.

After the pre-sulfurization treatment, the fluid catalytic cracking residual oil is fed to a fixed bed reaction unit provided with a hydrodesulfurization system, and hydrodesulfurization is performed under high temperature and high pressure conditions in a hydrogen atmosphere.

The reaction pressure (hydrogen partial pressure) is preferably in a range of 4 to 12 MPa and more preferably in a range of 5 to 11 MPa. In a case where the reaction pressure is less than 4 MPa, desulfurization and denitrification tend to decrease significantly.

Further, in a case where the reaction pressure is greater than 12 MPa, hydrogen consumption increases, and thus the operating cost increases.

The reaction temperature is preferably in a range of 280° C. to 400° C. and more preferably in a range of 300° C. to 360° C. In a case where the reaction temperature is lower than 280° C., the desulfurization and denitrification activities tend to decrease significantly, which is not practical. In a case where the reaction temperature is 400° C. or higher, a ring-opening reaction is caused due to thermal cracking, and catalyst degradation is significant in a case where the reaction temperature is higher than 400° C.

The liquid hourly space velocity is not particularly limited, but is preferably in a range of 0.2 to $3h^{-1}$ and more preferably in a range of 0.5 to $2h^{-1}$. In a case where the liquid hourly space velocity is less than $0.2h^{-1}$, since the treatment amount is low, the productivity decreases, which is not practical. Further, in a case where the liquid hourly space velocity is greater than $3h^{-1}$, the reaction temperature increases, and the catalyst degradation speeds up.

The ratio of hydrogen/oil is preferably in a range of 180 to 700 $Nm^3/m^3$ and more preferably in a range of 250 to 600 $Nm^3/m^3$. In a case where the ratio of hydrogen/oil is less than 180 $Nm^3/m^3$, the desulfurization activity decreases. Further, in a case where the ratio thereof is greater than 700 $Nm^3/m^3$, the operating cost increases while the desulfurization activity does not change significantly.

The content of the bicyclic aroma component in the first heavy oil obtained in the above-described manner is preferably 20% by mass or greater and more preferably 25% by mass or greater. Within this range, the polycyclic aroma component is considered to have been hydrodesulfurized, and a heavy oil containing a large number of aroma content of 2 to 3 rings is obtained after the decomposition of the polycyclic aroma component. The obtained heavy oil can be used in a feedstock composition to form a bulk mesophase suitable for obtaining a synthetic graphite material composed of a microstructure having a selective orientation composed of crystallites in which hexagonal network planes of a relatively small size are laminated. Further, the bicyclic aroma component can be quantified by the HPLC method.

<Second Heavy Oil>

The second heavy oil does not contain the first heavy oil and the fluid catalytic cracking residual oil which is the raw material oil of the first heavy oil, and the sulfur content is preferably 0.4% by mass or less, more preferably 0.35% by mass or less, and still more preferably 0.30% by mass or less. In a case where the sulfur content is greater than the above-described upper limit, the development of the bulk mesophase may be inhibited, which is not preferable. The asphaltene content of the second heavy oil is preferably 5% by mass or less, more preferably 4% by mass or less, and still more preferably 3% by mass or less. In a case where the asphaltene content is greater than the above-described upper limit, the development of the bulk mesophase may be inhibited, which is not preferable.

The saturated content of the second heavy oil is preferably 60% by mass or greater, more preferably 65% by mass or greater, and still more preferably 70% by mass or greater. Even in a case where the saturated content is less than the above-described lower limit, the development of the bulk mesophase may be inhibited, which is not preferable. The initial boiling point of the second heavy oil is preferably 200° C. or higher and more preferably 250° C. or higher. Further, the density of the second heavy oil at 15° C. is preferably in a range of 0.85 to 0.94 $g/cm^3$. It is preferable that the second heavy oil is hydrodesulfurized oil obtained by hydrodesulfurizing heavy oil having a sulfur content of 2% by mass or greater under the condition of a total pressure of 16 MPa or greater such that the hydrocracking rate reaches 30% or less. The heavy oil serving as a raw material of the second heavy oil has a sulfur content of 2% by mass or greater, preferably 2.5% by mass or greater, and more preferably 3% by mass or greater.

The heavy oil having a sulfur content of 2% by mass or greater is not particularly limited as long as the sulfur content satisfies the above-described conditions, and examples thereof include crude oil, atmospheric residual oil or vacuum residual oil obtained by distillation of crude oil, visbreaking oil, tar sands oil, shale oil, and mixed oils thereof. Among these, atmospheric residual oil and vacuum residual oil are preferably used.

<Hydrodesulfurization to Obtain Second Heavy Oil>

The hydrodesulfurization for obtaining the second heavy oil is performed under a condition of a total pressure of 16 MPa or greater, preferably 17 MPa or greater, and more preferably 18 MPa or greater. Further, in a case where the total pressure is less than the above-described lower limit, the cracking of heavy oil by hydrodesulfurization proceeds excessively, and thus heavy oil that is effective as raw material oil for petroleum coke cannot be obtained.

Further, the conditions for the hydrodesulfurization other than the total pressure are not particularly limited as long as the hydrocracking rate is 30% or less, and it is preferable to set various conditions as follows. That is, the temperature of the hydrodesulfurization is preferably in a range of 300° C. to 500° C. and more preferably in a range of 350° C. to 450° C.; the ratio of hydrogen/oil is preferably in a range of 400 to 3000 NL/L and more preferably in a range of 500 to 1800 NL/L; the hydrogen partial pressure is preferably in a range of 7 to 20 MPa and more preferably in a range of 8 to 17 MPa; and the liquid hourly space velocity (LHSV) is preferably in a range of 0.1 to 3 $h^{-1}$, more preferably in a range of 0.15 to 1.0 $h^{-1}$, and still more preferably in a range of 0.15 to 0.75 $h^{-1}$. Further, examples of the catalyst used for hydrodesulfurization (hydrodesulfurization catalyst) include a Ni—Mo catalyst, a Co—Mo catalyst, and a catalyst obtained by combining a Ni—Mo catalyst and a Co—Mo catalyst, and commercially available products may be used.

<Heavy Oil Other than First Heavy Oil and Second Heavy Oil>

The raw material oil may contain other heavy oils and fluid cracking residual oils in a predetermined ratio in addition to the above-mentioned first heavy oil and second heavy oil. The fluid catalytic cracking residual oil in this case is heavy oil that does not correspond to the first heavy oil and the second heavy oil, which is heavy oil having a sulfur content of preferably 0.5% by mass or less and a bicyclic aroma component content of preferably 20% by mass or greater, and examples thereof include fluid catalytic cracking residual oil using vacuum desulfurized gas oil as raw material oil.

<Production of Coking Coal Composition>

The raw material oil (mixed oil) including at least the above-described first heavy oil and the second heavy oil is caulked in a temperature range of 400° C. to 600° C. In a case where the raw material oil contains only the first heavy oil, a satisfactory bulk mesophase is formed, but the amount of gas generated during solidification in the coking process is not sufficient. Therefore, the mesophase is not oriented in the uniaxial direction, and variation occurs in the progress speed of graphitization in the subsequent heat treatment, which is not preferable. Therefore, the raw material oil includes at least the second heavy oil in addition to the first heavy oil. However, in a case where the amount of the first raw material oil is extremely small, the bicyclic or tricyclic aroma component generated by desulfurization of the "polycyclic aroma component which is hardly desulfurized" are insufficient, and a fine structure in which relatively small-sized hexagonal network planes are laminated is unlikely to be sufficiently introduced to the bulk mesophase. Therefore, the content of the first heavy oil is set to be in a range of 15% to 80% by mass with respect to the total amount of the raw material oil, including a case where the raw material oil contains other heavy oils in addition to the first heavy oil and the second heavy oil.

As the method of coking the raw material oil, the delayed coking method is preferable. Specifically, it is preferable that the coking coal composition is prepared by putting the raw material oil into a delayed coker, heating the oil, and thermally cracking and polycondensing the resultant under the condition that the coking pressure is controlled.

<Production of Synthetic Graphite Material>

The coking coal composition obtained in the above-described manner is pulverized and classified so as to have a predetermined particle size. The particle size thereof is preferably 41 µm or less in terms of the average particle diameter. The average particle diameter is obtained based on the measurement using a laser diffraction type particle size distribution meter. The reason why the average particle diameter is 41 µm or less is that this particle size is typically and preferably used for a negative electrode carbon material for a lithium ion secondary battery. Further, the average particle diameter is preferably in a range of 5 to 41 µm. Since the specific surface area of a graphite material obtained by carbonizing raw coke having an average particle diameter of less than 5 µm is extremely large, in a case where a paste-like highly viscous fluid used in production of an electrode plate of a negative electrode for a lithium ion secondary battery is prepared using such a graphite material, the amount of the solvent to be required is extremely large, which is not preferable.

The method of performing the carbonization treatment is not particularly limited, and a method of performing a heat treatment at a highest reach temperature of 900° C. to 1500° C. for a highest reach temperature holding time of 0 to 10 hours in an atmosphere of inert gas such as nitrogen, argon, or helium is a typical example. Further, even in a case where the carbonization step is not provided as necessary, there is almost no impact on the physical properties of the graphite material to be finally produced.

The method of performing the graphitization treatment is not particularly limited, and a method of performing a heat treatment at a highest reach temperature of 2500° C. to 3200° C. for a highest reach temperature holding time of 0 to 100 hours in an atmosphere of inert gas such as nitrogen, argon, or helium is a typical example. The graphitization can also be performed by enclosing pulverized raw coke and/or calcined coke in a crucible using a graphitization furnace such as an Acheson furnace or an LWG furnace.

The synthetic graphite material of the present embodiment can exhibit excellent characteristics even in a case of being used as it is as a negative electrode material for a lithium ion secondary battery. Further, even in a case where the synthetic graphite material of the present embodiment is mixed with a synthetic graphite material or a natural graphite-based material outside the range of the present embodiment, excellent characteristics in which capacity degradation due to repetition of charging and discharging of the battery at a temperature of 0° C. or lower can be suppressed are exhibited. The inventors have found this effect and have completed a third invention of the present application. Examples of the natural graphite-based material include naturally produced graphite-like materials, materials obtained by highly purifying the graphite-like materials, highly purified and then spherically formed (including a mechanochemical treatment) materials, and materials obtained by coating surfaces of high-purity products and spherical products with other carbons (for example, pitch-coated products and CVD-coated products), and materials which have been subjected to a plasma treatment. The materials used in the present embodiment may be scaly or spherical. The mixing ratio of the synthetic graphite material of the present embodiment to synthetic graphite or natural graphite outside the range of the present embodiment is in a range of 10:90 to 90:10, preferably in a range of 20:80 to 80:20, and still more preferably in a range of 30:70 to 70:30 in terms of weight ratio.

[Negative Electrode for Lithium Ion Secondary Battery]

Next, the negative electrode of the lithium ion secondary battery will be described. The method of producing the negative electrode for a lithium ion secondary battery is not particularly limited, and examples thereof include a method of pressure-molding a mixture (negative electrode mixture) containing the synthetic graphite material of the present embodiment, a binder (binding agent), a conductive assistant as necessary, and an organic solvent to predetermined dimensions. Examples of other method include a method of kneading the synthetic graphite material of the present embodiment, the binder, the conductive assistant, and the like in an organic solvent to obtain a slurry, coating a current collector such as copper foil with the slurry, and drying the slurry, that is, rolling the negative electrode mixture and cutting the negative electrode mixture into predetermined dimensions.

Examples of the binder (binding agent) include polyvinylidene fluoride, polytetrafluoroethylene, and styrene-butadiene rubber (SBR). The content of the binder in the negative electrode mixture may be appropriately set to approximately 1 to 30 parts by mass with respect to 100 parts by mass of the synthetic graphite material, as necessary in consideration of the design of the battery.

Examples of the conductive assistant include carbon black, graphite, acetylene black, an indium-tin oxide exhibiting conductivity, and conductive polymers such as polyaniline, polythiophene, and polyphenylene vinylene. The amount of the conductive assistant to be used is preferably in a range of 1 to 15 parts by mass with respect to 100 parts by mass of the synthetic graphite material.

Examples of the organic solvent include dimethylformamide, N-methylpyrrolidone, isopropanol, and toluene.

As a method of mixing the synthetic graphite material, the binder, the conductive assistant as necessary, and the organic solvent, a known device such as a screw type kneader, a ribbon mixer, a universal mixer, or a planetary mixer can be used. The mixture can be molded by roll pressure or press pressure, and the pressure here is preferably approximately 100 to 300 MPa.

The material of the current collector can be used without particular limitation as long as the material does not form an alloy with lithium. Examples of the material include copper, nickel, titanium, and stainless steel. Further, the shape of the current collector can also be used without particular limitation, and examples thereof include strip-like materials with a foil shape, a perforated foil shape, and a mesh shape. Further, a porous material such as a porous metal (foam metal) or carbon paper can also be used.

The method of coating the current collector with the slurry is not particularly limited, and examples thereof include known methods such as a metal mask printing method, an electrostatic coating method, a dip coating method, a spray coating method, a roll coating method, a doctor blade method, a gravure coating method, a screen printing method, and a die coater method. After the current collector is coated with the slurry, a rolling treatment is typically performed with a flat press, a calendar roll, or the like as necessary. Further, the negative electrode material slurry molded into a sheet shape, a pellet shape, or the like and the current collector can be integrated according to a known method such as a method using a roll, a press, or a combination thereof.

[Lithium Ion Secondary Battery]

Next, the lithium ion secondary battery of the present embodiment will be described.

FIG. 1 is a schematic cross-sectional view showing an example of the lithium ion secondary battery of the present embodiment. A lithium ion secondary battery 10 shown in FIG. 1 includes a negative electrode 11 integrated with a negative electrode current collector 12 and a positive electrode 13 integrated with a positive electrode current collector 14. In the lithium ion secondary battery 10 shown in FIG. 1, the negative electrode of the present embodiment is used as the negative electrode 11. The negative electrode 11 and a positive electrode 13 are disposed to face each other with a separator 15 interposed therebetween. In FIG. 1, the reference numeral 16 represents an aluminum laminate exterior. An electrolytic solution is injected into the aluminum laminate exterior 16.

The positive electrode 10 contains an active material, a binder (binding agent), and a conductive assistant contained as necessary.

As the active material, a known material used for a positive electrode for a lithium ion secondary battery can be used, and a metal compound, a metal oxide, a metal sulfide, or a conductive polymer material which is capable of doping or intercalating lithium ions can be used. Specific examples of the active material include lithium cobaltate ($LiCoO_2$), lithium nickelate ($LiNiO_2$), lithium manganate ($LiMn_2O_4$), a complex oxide ($LiCo_XNi_YMn_ZO_2$, X+Y+Z=1), a lithium vanadium compound, $V_2O_5$, $V_6O_{13}$, $VO_2$, $MnO_2$, $TiO_2$, $MoV_2O_8$, $TiS_2$, $V_2S_5$, $VS_2$, $MoS_2$, $MOS_3$, $Cr_3O_8$, $Cr_2O_5$, olivine type $LiMPO_4$ (M:Co, Ni, Mn, Fe), a conductive polymer such as polyacetylene, polyaniline, polypyrrole, polythiophene, or polyacene, porous carbon, and mixtures thereof.

As the binder, the same binder as that used for the negative electrode 11 described above can be used.

As the conductive assistant, the same conductive assistant as that used for the negative electrode 11 described above can be used.

As the positive electrode current collector 14, the same negative electrode current collector as described above can be used.

As the separator 15, for example, non-woven fabric, a cloth, a microporous film, which contains polyolefin such as polyethylene or polypropylene as a main component, or a combination thereof can be used.

Further, in a case where the lithium ion secondary battery has a structure in which the positive electrode and the negative electrode do not come into direct contact with each other, the separator is unnecessary.

As the electrolytic solution and an electrolyte used in the lithium ion secondary battery 10, a known organic electrolytic solution, an inorganic solid electrolyte, and a polymer solid electrolyte which are used in a lithium ion secondary battery can be used.

As the electrolytic solution, it is preferable to use an organic electrolytic solution from the viewpoint of the electrical conductivity.

Examples of the organic electrolytic solution include an ether such as dibutyl ether, ethylene glycol monomethyl ether, ethylene glycol monoethyl ether, ethylene glycol monobutyl ether, diethylene glycol monomethyl ether, or ethylene glycol phenyl ether, an amide such as N-methylformamide, N,N-dimethylformamide, N-ethylformamide, N,N-diethylformamide, N-methylacetamide, N,N-dimethylacetamide, N-ethylacetamide, or N,N-diethylacetamide, a sulfur-containing compound such as dimethyl sulfoxide or sulfolane, dialkyl ketone such as methyl ethyl ketone or methyl isobutyl ketone, a cyclic ether such as tetrahydrofuran or 2-methoxy tetrahydrofuran, a cyclic carbonate such as ethylene carbonate, butylene carbonate, propylene carbonate, or vinylene carbonate, a chain-like carbonate such as diethyl carbonate, dimethyl carbonate, methyl ethyl carbonate, or methyl propyl carbonate, cyclic carbonic acid ester such as y-butyrolactone or y-valerolactone, chain-like carbonic acid ester such as methyl acetate, ethyl acetate, methyl propionate, or ethyl propionate, and an organic solvent such as N-methyl-2-pyrrolidinone, acetonitrile, or nitromethane. These organic electrolytic solutions can be used alone or in the form of a mixture of two or more kinds thereof.

As the electrolyte, various known lithium salts can be used.

Examples of the lithium salts include $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $LIN(CF_3SO_2)_2$, and $LiN(C_2F_5SO_2)_2$.

Examples of the polymer solid electrolyte include a polyethylene oxide derivative and a polymer containing the derivative, a polypropylene oxide derivative and a polymer containing the derivative, a phosphoric acid ester polymer, and a polycarbonate derivative and a polymer containing the derivative.

Since the lithium ion secondary battery 10 of the present embodiment includes the negative electrode 11 containing the synthetic graphite material of the present embodiment, capacity degradation is unlikely to occur even in a case where the charge and discharge cycles are repeated at a low temperature of 0° C. or lower. Therefore, the lithium ion secondary battery 10 of the present embodiment can be preferably used for industrial purposes such as applications for automobiles such as hybrid automobiles, plug-in hybrid automobiles, and electric automobiles and power storage of system infrastructures.

Further, the lithium ion secondary battery of the present embodiment is not limited as long as the battery is used the negative electrode of the present embodiment, and is not restricted in selecting members necessary for the configuration of the battery other than the negative electrode.

Specifically, the structure of the lithium ion secondary battery of the present embodiment is not limited to the lithium ion secondary battery 10 shown in FIG. 1.

The lithium ion secondary battery may have, for example, a structure obtained by inserting a wound electrode group in which a positive electrode and a negative electrode, which are molded into a strip shape, are spirally wound through a separator, into a battery case and sealing the case. Further, the lithium ion secondary battery may be a structure obtained by enclosing a laminated electrode plate group in which a positive electrode and a negative electrode, which are molded into a flat plate shape, are sequentially laminated through a separator, in an exterior body.

The lithium ion secondary battery of the present embodiment can be used as, for example, a paper cell, a button cell, a coin cell, a laminated cell, a cylindrical cell, or a square cell, etc.

EXAMPLES

Hereinafter, the present invention will be described in more detail with reference to examples and comparative examples. Further, the present invention is not limited to the following examples.

<Measurement of Physical Properties>
(1) Calculation of Size L (112) of Crystallite of Graphite Powder The graphite powder was mixed with 10% by mass of a Si standard sample as an internal standard, a glass sample holder (window frame size of 16 mm×20 mm, depth of 0.2 mm) was packed with the mixture, and the measurement was performed according to a wide angle X-ray diffraction method in conformity with JIS R7651 (2007), and the size L (112) of the crystallite of the graphite powder was calculated. ULTIMA IV (manufactured by Rigaku Corporation) was used as the X-ray diffractometer, and CuKα rays (using Kβ filter Ni) were used as the X-ray source. Further, the voltage applied to the X-ray tube and the current thereof were respectively set to 41 kV and 41 mA. The obtained diffraction pattern was also analyzed according to a method in conformity with JIS R7651 (2007). Specifically, the measurement data was subjected to a smoothing treatment, and then to absorption correction, polarization correction, and Lorentz correction after background removal. Thereafter, the (112) diffraction line of the graphite powder was corrected using the peak position and the half width of a diffraction line (422) of the Si standard sample, and the size L (112) of the crystallite was calculated. Further, the size of the crystallite was calculated based on the half width of the corrected peak using the following Scherrer equation. The measurement and the analysis were carried out three times each, and the average value was defined as the size L (112).

$$L = K \times \lambda / (\beta \times \cos\theta B)$$ Scherrer equation

Here, L represents the crystal size (nm).
K represents the shape factor constant (=1.0).
λ represents the wavelength of X-rays (=0.15416 nm).
θ represents the Bragg angle (corrected diffraction angle).
β represents the true half width (correction value).

(2) Measurement of Surface Area Based on Volume

The particle size distribution was measured using a laser diffraction/scattering type particle diameter distribution measuring device (MT3300EXII) (manufactured by Microtrac Bell Co., Ltd). The dispersion liquid used for the measurement was prepared by adding a 0.1 mass % sodium hexametaphosphate aqueous solution (several drops) and a surfactant (several drops) to approximately 0.5 g of the graphite powder, sufficiently stirring the solution using a mortar so as to be homogeneous, further adding 41 mL of a 0.1 mass % sodium hexametaphosphate aqueous solution thereto, and dispersing the solution using an ultrasonic homogenizer. The surface area was calculated based on the obtained measurement results of the particle size distribution in conformity with "5.5 Calculation of surface area based on volume" in "Representation of results of particle size analysis—Part 2: Calculation of average particle sizes/diameters of moments from particle size distributions" of JIS Z 8819-2 (2001).

(3) Measurement of Oil Absorption

The oil absorption was measured and calculated in conformity with "Oil absorption—Section 1: Refined linseed oil method" of JIS K 5101-13-1 (2004). First, the finely weighed graphite powder was placed on a measuring plate, refined linseed oil was added dropwise thereto from a burette having a volume of 10 mL, the refined linseed oil was kneaded with a palette knife so as to be completely kneaded, and the dropwise addition and the kneading were repeatedly performed. Next, the point where the paste had a smooth hardness was set as the end point, and the oil absorption was finally calculated based on the following equation.

$$O1 = 100 \times V/m$$

Here, O1 represents the oil absorption (mL00g).
V represents the volume (mL) of the refined linseed oil which had been added dropwise.
m represents the weight (g) of the graphite powder placed on the measuring plate.

(4) Measurement of ΔHpp (4.8K)

ESR measurement was performed by putting 2.5 mg of the graphite material into a sample tube, vacuum-drawing the sample tube with a rotary pump, and enclosing the sample tube with He gas. As an ESR device, a microwave frequency counter, a Gauss meter, and a cryostat, ESP350E (manufactured by Bruker Instruments), HP5351P (manufactured by Hewlett-Packard Company), ER035M (manufactured by Bruker Instruments), and ESR910 (manufactured by Oxford Instruments) were respectively used. ΔHpp was measured using an X band (9.47 GHz) as the microwave under conditions of an intensity of 1 mW, a central magnetic field of 3360 G, and a magnetic field modulation of 100 kHz. The ESR measurement was performed at a measurement temperature of 4.8 K. The results of the line width ΔHpp (4.8K) of the ESR spectrum of the graphite materials obtained in the examples and the comparative examples are as listed in Table 1. As the line width ΔHpp, a value obtained by reading the interval between two peaks (the maximum and minimum peaks) in the ESR spectrum (differential curve) was used. It was confirmed that the spectrum derived from carbon appearing in an electron spin resonance method as measured using an X band was in a range of 3200 to 3400 gauss (G) in all the examples and comparative examples.

<Production of Synthetic Graphite Material for Negative Electrode of Lithium Ion Secondary Battery>

Example 1

Desulfurized vacuum gas oil (sulfur content of 500 mass ppm, density of 0.88 g/cm³ at 15° C.) was subjected to fluid catalytic cracking, thereby obtaining fluid catalytic cracking residual oil (hereinafter, referred to as "fluid catalytic cracking residual oil (A)"). The obtained fluid catalytic cracking residual oil (A) had an initial boiling point of 220° C., a sulfur content of 0.2% by mass, and an aroma component content of 60% by mass. Further, atmospheric residual oil having a sulfur content of 3.5% by mass was hydrodesulfurized in the presence of a Ni—Mo catalyst such that the hydrocracking rate reached 30% or less, thereby obtaining hydrodesulfurized oil (hereinafter, also referred to as "hydrodesulfurized oil (A)"). The obtained hydrodesulfurized oil (A) had an initial boiling point of 260° C., a sulfur content of 0.3% by mass, an asphaltene component content of 1% by mass, a saturated content of 70% by mass, and a density of 0.92 g/cm³ at 15° C.

Next, desulfurized vacuum gas oil (sulfur content of 500 mass ppm, density of 0.88 g/cm³ at 15° C.) was mixed with hydrodesulfurized oil (A) (initial boiling point of 260° C., sulfur content of 0.3% by mass, asphaltene component content of 1% by mass, saturated content of 70% by mass, density of 0.92 g/cm³ at 15° C.) at a mass ratio of 1:3, and the mixed oil was subjected to fluid catalytic cracking, thereby obtaining fluid catalytic cracking residual oil (hereinafter, referred to as "fluid catalytic cracking residual oil (B)"). The obtained fluid catalytic cracking residual oil (B) had an initial boiling point of 220° C., a sulfur content of 0.7% by mass, an aroma component content of 80% by mass, a bicyclic aroma component content of 14% by mass, and a density of 1.07 g/cm³ at 15° C.

Next, the following hydrodesulfurization system was used to hydrodesulfurize the fluid catalytic cracking residual oil (B). As the catalyst, a catalyst 1, a catalyst 2, and a catalyst 3 produced in the following manners were used.

[Production of Catalyst 1]

A basic aluminum salt aqueous solution and an acidic aluminum salt aqueous solution were neutralized to obtain an alumina hydrate slurry (3 kg in terms of Al₂O₃). The obtained alumina hydrate slurry was washed to remove by-product salts to obtain an alumina hydrate. The alumina hydrate was adjusted to have a pH of 10.5 and aged at 95° C. for 10 hours. The slurry after completion of the aging was dehydrated and concentrated and kneaded with a kneader so as to have a predetermined moisture content, thereby obtaining an alumina kneaded product. 50 g of nitric acid was added to the obtained alumina kneaded product, and the mixture was concentrated and kneaded again so as to have a predetermined moisture content, molded into a cylindrical shape having a size of 1.8 mm, and dried at 110° C. The dried molded product was calcined at a temperature of 550° C. for 3 hours to obtain a carrier. The composition of the carrier was 100% by mass of alumina.

Next, 226 g of molybdenum trioxide and 57 g of basic nickel carbonate were suspended in ion exchange water, 132 g of phosphoric acid was added to and dissolved in the suspension to obtain an impregnating solution, and 1 kg of the carrier was sprayed and impregnated with the solution. The impregnated product was dried and calcined at 550° C. for 1 hour, thereby obtaining the target catalyst 1.

The average pore diameter of the catalyst was measured, and the value was 150 Å. Further, the average pore diameter was measured by a mercury press-in method and calculated using a surface tension of mercury of 480 dyne/cm and a contact angle of 140°. The content of nickel oxide and the content of molybdenum oxide were respectively 2.5% by mass and 18% by mass with respect to the amount of the catalyst.

[Production of Catalyst 2]

In the preparation of a carrier, a carrier was obtained by performing preparation in the same manner as in the preparation of the catalyst 1 except that 100 g of nitric acid, 479 g of commercially available silica sol S-20L (manufactured by JGC C&C), and 155 g of phosphoric acid were added to the obtained alumina kneaded product. The composition of the carrier was 94% by mass of alumina, 3% by mass of silica, and 53% by mass of P2O. In the preparation of an impregnating solution, the catalyst 2 was obtained by performing the same preparation as that for the catalyst 1 except that 232 g of molybdenum trioxide, 23 g of basic nickel carbonate, and 76 g of cobalt carbonate were used. The average pore diameter of the catalyst was measured, and the value was 100 Å. The content of nickel oxide, the content of cobalt oxide, and the content of molybdenum oxide were respectively 1% by mass, 3.5% by mass, and 18% by mass with respect to the amount of the catalyst.

[Production of Catalyst 3]

1000 g of a titanyl sulfate solution (5% by mass in terms of titania (TiO₂)), 1900 g of pure water, and 370 g of sulfuric acid were mixed and stirred at 40° C. for 1 hour, and 353 g of 8.5 mass % water glass was added dropwise thereto for 1.5 hours while the solution was stirred. After completion of the dropwise addition, the solution was continuously stirred at 40° C. for 2.5 hours. 15% by mass of ammonia water was added to the obtained solution until the pH thereof reached 7.2, and the state where the pH of the solution was 7.2 was maintained for 2 hours, thereby obtaining a silica titania primary particle-containing solution. Next, the temperature of the silica titania primary particle-containing solution was adjusted to 60° C., and 25.6 kg of an alumina slurry containing boehmite (3.6% by mass in terms of alumina (Al2O3)) was added thereto, and 15% by mass of ammonia water was added thereto such that the pH thereof reached 7.2. The state where the pH of the solution was 7.2 was maintained for 1 hour, the solution was dehydrated and washed to remove by-product salts, thereby obtaining a slurry of oxide gel. Thereafter, a carrier was obtained by performing the same preparation as that for the catalyst 1. The composition of the carrier was 92% by mass of alumina, 3% by mass of silica, and 5% by mass of titania. In the preparation of an impregnating solution, the catalyst 3 was obtained by performing the same preparation as that for the catalyst 1 except that 297 g of molybdenum trioxide, 74 g of basic nickel carbonate, and 101 g of phosphoric acid were used. The average pore diameter of the catalyst was measured, and the value was 75 Å. The contents of nickel oxide and the content of molybdenum oxide were respectively 3% by mass and 22% by mass with respect to the amount of the catalyst.

First, pre-sulfurization of the flow-type fixed bed reaction unit was performed. A circulation type fixed bed reaction unit was filled with 20 ml of the catalyst 1, 50 ml of the catalyst 2, and 30 ml of the catalyst 3 in order, a reaction tower was heated from room temperature at a rate of 10° C./min under a total pressure of 6 MPa while mixed gas (hydrogen:hydrogen sulfide=97% by volume: 3% by volume) was allowed to flow at a flow rate of 30 L/hour, the reaction tower was maintained at 240° C. for 4 hours, heated again to 340° C. at a rate of 10° C./min, maintained at 340° C. for 24 hours, and the pre-sulfurization was completed.

Thereafter, the fluid catalytic cracking residual oil (B) was circulated into the circulation type fixed bed reaction unit at a rate of 70 ml/hour, and hydrodesulfurization was performed under reaction conditions of a hydrogen partial pressure of 6 MPa, a liquid hourly space velocity of 0.7 h$^{-1}$, a hydrogen/oil ratio of 470 NL/L, and a reaction temperature of 310° C., thereby obtaining desulfurized fluid catalytic cracking residual oil (hereinafter, referred to as "desulfurized fluid catalytic cracking residual oil (B-1)"). The obtained desulfurized fluid catalytic cracking residual oil (B-1) had 28% by mass of the bicyclic aroma component. Next, the desulfurized fluid catalytic cracking residual oil (B-1) and the hydrodesulfurized oil (A) were mixed at a mass ratio of 80:20, thereby obtaining a raw material oil composition.

The raw material oil composition was put into a test tube and subjected to a heat treatment at 500° C. for 3 hours under normal pressure for coking, thereby obtaining a coking coal composition. The coking coal composition was pulverized with a hammer type mill such that the average particle diameter measured by a laser diffraction type particle size distribution measuring device reached 22.9 μm. The obtained pulverized material was calcined at 1000° C. in a nitrogen gas stream to obtain calcined coke. Here, a treatment of increasing the temperature from room temperature to 1000° C. for a heating time of 4 hours, holding the temperature at 1000° C. for a holding time of 4 hours, lowering the temperature from 1000° C. to 410° C. for a cooling time of 2 hours, and allowing the material to be naturally cooled for 4 hours while maintaining the nitrogen gas stream after the temperature reached 410° C. was performed. The obtained calcined coke was put into a graphite crucible and graphitized at 2700° C. under a nitrogen gas stream using a high-frequency induction furnace. Here, a treatment of increasing the temperature from room temperature to 2700° C. for a heating time of 23 hours, holding the temperature at 2700° C. for a holding time of 3 hours, and natural cooling for 6 days, and taking out the resultant was performed. The obtained graphite material was pulverized with an air flow jet mill such that the average particle diameter thereof measured by a laser diffraction type particle size distribution measuring device reached 5.1 μm, thereby obtaining a synthetic graphite material. The size L (112) of the crystallite, the surface area based on the volume, the oil absorption, and ΔHpp (4.8K) of the obtained synthetic graphite material are listed in Table 1.

Example 2

The desulfurized fluid catalytic cracking residual oil (B-1), the fluid catalytic cracking residual oil (A), and the hydrodesulfurized oil (A) were mixed at a mass ratio of 15:65:20, thereby obtaining a raw material oil composition. The raw material oil composition was put into a test tube and subjected to a heat treatment at 500° C. for 3 hours under normal pressure for coking, thereby obtaining a coking coal composition. The coking coal composition was pulverized with a hammer type mill such that the average particle diameter measured by a laser diffraction type particle size distribution measuring device reached 18.8 μm. The obtained pulverized material was calcined at 1000° C. in a nitrogen gas stream to obtain calcined coke. Here, a treatment of increasing the temperature from room temperature to 1000° C. for a heating time of 4 hours, holding the temperature at 1000° C. for a holding time of 4 hours, lowering the temperature from 1000° C. to 410° C. for a cooling time of 2 hours, and allowing the material to be naturally cooled for 4 hours while maintaining the nitrogen gas stream after the temperature reached 410° C. was performed. The obtained calcined coke was put into a graphite crucible and graphitized at 2800° C. under a nitrogen gas stream using a high-frequency induction furnace. Here, a treatment of increasing the temperature from room temperature to 2800° C. for a heating time of 23 hours, holding the temperature at 2800° C. for a holding time of 3 hours, and natural cooling for 6 days, and taking out the resultant was performed. The obtained graphite material was pulverized with an air flow jet mill such that the average particle diameter thereof measured by a laser diffraction type particle size distribution measuring device reached 13.2 μm, thereby obtaining a synthetic graphite material. The size L (112) of the crystallite, the surface area based on the volume, the oil absorption, and ΔHpp (4.8K) of the obtained synthetic graphite material are listed in Table 1.

Example 3

The desulfurized fluid catalytic cracking residual oil (B-1), the fluid catalytic cracking residual oil (A), and the hydrodesulfurized oil (A) were mixed at a mass ratio of 40:40:20, thereby obtaining a raw material oil composition. The raw material oil composition was put into a test tube and subjected to a heat treatment at 500° C. for 3 hours under normal pressure for coking, thereby obtaining a coking coal composition. The coking coal composition was pulverized with a hammer type mill such that the average particle diameter measured by a laser diffraction type particle size distribution measuring device reached 20.5 μm. The obtained pulverized material was calcined at 1000° C. in a nitrogen gas stream to obtain calcined coke. Here, a treatment of increasing the temperature from room temperature to 1000° C. for a heating time of 4 hours, holding the temperature at 1000° C. for a holding time of 4 hours, lowering the temperature from 1000° C. to 410° C. for a cooling time of 2 hours, and allowing the material to be naturally cooled for 4 hours while maintaining the nitrogen gas stream after the temperature reached 410° C. was performed. The obtained calcined coke was put into a graphite crucible and graphitized at 2900° C. under a nitrogen gas stream using a high-frequency induction furnace. Here, a treatment of increasing the temperature from room temperature to 2900° C. for a heating time of 23 hours, holding the temperature at 2900° C. for a holding time of 3 hours, and natural cooling for 6 days, and taking out the resultant was performed. The obtained graphite material was pulverized with an air flow jet mill such that the average particle diameter thereof measured by a laser diffraction type particle size distribution measuring device reached 10.3 μm, thereby obtaining a synthetic graphite material. The size L (112) of the crystallite, the surface area based on the volume, the oil absorption, and ΔHpp (4.8K) of the obtained synthetic graphite material are listed in Table 1.

Example 4

The desulfurized fluid catalytic cracking residual oil (B-1), the fluid catalytic cracking residual oil (A), and the hydrodesulfurized oil (A) were mixed at a mass ratio of 30:50:20, thereby obtaining a raw material oil composition. The raw material oil composition was put into a test tube and subjected to a heat treatment at 500° C. for 3 hours under normal pressure for coking, thereby obtaining a coking coal composition. The coking coal composition was pulverized with a hammer type mill such that the average particle diameter measured by a laser diffraction type particle size distribution measuring device reached 57.6 µm. The obtained pulverized material was put into a graphite crucible, embedded an Acheson furnace with coke breeze, and graphitized at 3050° C. Here, a treatment of increasing the temperature from room temperature to 3050° C. for a heating time of 130 hours, holding the temperature at 3050° C. for a holding time of 8 hours, and allowing the material to be naturally cooled for 25 days, and taking out the resultant was performed. The obtained graphite material was pulverized with an air flow jet mill such that the average particle diameter thereof measured by a laser diffraction type particle size distribution measuring device reached 29.8 µm, thereby obtaining a synthetic graphite material. The size L (112) of the crystallite, the surface area based on the volume, the oil absorption, and ΔHpp (4.8K) of the obtained synthetic graphite material are listed in Table 1.

Example 5

The desulfurized fluid catalytic cracking residual oil (B-1), the fluid catalytic cracking residual oil (A), and the hydrodesulfurized oil (A) were mixed at a mass ratio of 70:10:20, thereby obtaining a raw material oil composition. The raw material oil composition was put into a test tube and subjected to a heat treatment at 500° C. for 3 hours under normal pressure for coking, thereby obtaining a coking coal composition. The coking coal composition was pulverized with a hammer type mill such that the average particle diameter measured by a laser diffraction type particle size distribution measuring device reached 44.2 µm. The obtained pulverized material was put into a graphite crucible, embedded an Acheson furnace with coke breeze, and graphitized at 3150° C. Here, a treatment of increasing the temperature from room temperature to 3150° C. for a heating time of 130 hours, holding the temperature at 3150° C. for a holding time of 8 hours, and allowing the material to be naturally cooled for 25 days, and taking out the resultant was performed. The obtained graphite material was pulverized with an air flow jet mill such that the average particle diameter thereof measured by a laser diffraction type particle size distribution measuring device reached 8.3 µm, thereby obtaining a synthetic graphite material. The size L (112) of the crystallite, the surface area based on the volume, the oil absorption, and ΔHpp (4.8K) of the obtained synthetic graphite material are listed in Table 1.

Comparative Example 1

The desulfurized fluid catalytic cracking residual oil (B-1) was put into a test tube and subjected to a heat treatment at 500° C. for 3 hours under normal pressure for coking, thereby obtaining a coking coal composition. The coking coal composition was pulverized with a hammer type mill such that the average particle diameter measured by a laser diffraction type particle size distribution measuring device reached 30.4 µm. The obtained pulverized material was calcined at 1000° C. in a nitrogen gas stream to obtain calcined coke. Here, a treatment of increasing the temperature from room temperature to 1000° C. for a heating time of 4 hours, holding the temperature at 1000° C. for a holding time of 4 hours, lowering the temperature from 1000° C. to 410° C. for a cooling time of 2 hours, and allowing the material to be naturally cooled for 4 hours while maintaining the nitrogen gas stream after the temperature reached 410° C. was performed. The obtained calcined coke was put into a graphite crucible and graphitized at 2700° C. under a nitrogen gas stream using a high-frequency induction furnace. Here, a treatment of increasing the temperature from room temperature to 2700° C. for a heating time of 23 hours, holding the temperature at 2700° C. for a holding time of 3 hours, and natural cooling for 6 days, and taking out the resultant was performed. The obtained graphite material was pulverized with an air flow jet mill such that the average particle diameter thereof measured by a laser diffraction type particle size distribution measuring device reached 4.8 µm, thereby obtaining a synthetic graphite material. The size L (112) of the crystallite, the surface area based on the volume, the oil absorption, and ΔHpp (4.8K) of the obtained synthetic graphite material are listed in Table 1.

Comparative Example 2

The desulfurized fluid catalytic cracking residual oil (B-1), the fluid catalytic cracking residual oil (A), and the hydrodesulfurized oil (A) were mixed at a mass ratio of 10:60:20, thereby obtaining a raw material oil composition. The raw material oil composition was put into a test tube and subjected to a heat treatment at 500° C. for 3 hours under normal pressure for coking, thereby obtaining a coking coal composition. The coking coal composition was pulverized with a hammer type mill such that the average particle diameter measured by a laser diffraction type particle size distribution measuring device reached 19.8 µm. The obtained pulverized material was calcined at 1000° C. in a nitrogen gas stream to obtain calcined coke. Here, a treatment of increasing the temperature from room temperature to 1000° C. for a heating time of 4 hours, holding the temperature at 1000° C. for a holding time of 4 hours, lowering the temperature from 1000° C. to 410° C. for a cooling time of 2 hours, and allowing the material to be naturally cooled for 4 hours while maintaining the nitrogen gas stream after the temperature reached 410° C. was performed. The obtained calcined coke was put into a graphite crucible and graphitized at 2800° C. under a nitrogen gas stream using a high-frequency induction furnace. Here, a treatment of increasing the temperature from room temperature to 2800° C. for a heating time of 23 hours, holding the temperature at 2800° C. for a holding time of 3 hours, and natural cooling for 6 days, and taking out the resultant was performed. The obtained graphite material was pulverized with an air flow jet mill such that the average particle diameter thereof measured by a laser diffraction type particle size distribution measuring device reached 12.1 µm, thereby obtaining a synthetic graphite material. The size L (112) of the crystallite, the surface area based on the volume, the oil absorption, and ΔHpp (4.8K) of the obtained synthetic graphite material are listed in Table 1.

Comparative Example 3

The desulfurized fluid catalytic cracking residual oil (B-1), the fluid catalytic cracking residual oil (A), and the hydrodesulfurized oil (A) were mixed at a mass ratio of 5:75:20, thereby obtaining a raw material oil composition. The raw material oil composition was put into a test tube and subjected to a heat treatment at 500° C. for 3 hours under normal pressure for coking, thereby obtaining a coking coal composition. The coking coal composition was pulverized with a hammer type mill such that the average particle diameter measured by a laser diffraction type particle size distribution measuring device reached 29.7 μm. The obtained pulverized material was calcined at 1000° C. in a nitrogen gas stream to obtain calcined coke. Here, a treatment of increasing the temperature from room temperature to 1000° C. for a heating time of 4 hours, holding the temperature at 1000° C. for a holding time of 4 hours, lowering the temperature from 1000° C. to 410° C. for a cooling time of 2 hours, and allowing the material to be naturally cooled for 4 hours while maintaining the nitrogen gas stream after the temperature reached 410° C. was performed. The obtained calcined coke was put into a graphite crucible and graphitized at 2900° C. under a nitrogen gas stream using a high-frequency induction furnace. Here, a treatment of increasing the temperature from room temperature to 2900° C. for a heating time of 23 hours, holding the temperature at 2900° C. for a holding time of 3 hours, and natural cooling for 6 days, and taking out the resultant was performed. The obtained graphite material was pulverized with an air flow jet mill such that the average particle diameter thereof measured by a laser diffraction type particle size distribution measuring device reached 16.8 μm, thereby obtaining a synthetic graphite material. The size L (112) of the crystallite, the surface area based on the volume, the oil absorption, and ΔHpp (4.8K) of the obtained synthetic graphite material are listed in Table 1.

Comparative Example 4

The fluid catalytic cracking residual oil (A) was put into a test tube and subjected to a heat treatment at 500° C. for 3 hours under normal pressure for coking, thereby obtaining a coking coal composition. The coking coal composition was pulverized with a hammer type mill such that the average particle diameter measured by a laser diffraction type particle size distribution measuring device reached 38.6 μm. The obtained pulverized material was put into a graphite crucible, embedded an Acheson furnace with coke breeze, and graphitized at 3150° C. Here, a treatment of increasing the temperature from room temperature to 3150° C. for a heating time of 130 hours, holding the temperature at 3150° C. for a holding time of 8 hours, and allowing the material to be naturally cooled for 25 days, and taking out the resultant was performed. The obtained graphite material was pulverized with an air flow jet mill such that the average particle diameter thereof measured by a laser diffraction type particle size distribution measuring device reached 25.3 μm, thereby obtaining a synthetic graphite material. The size L (112) of the crystallite, the surface area based on the volume, the oil absorption, and ΔHpp (4.8K) of the obtained synthetic graphite material are listed in Table 1.

Comparative Example 5

The desulfurized fluid catalytic cracking residual oil (B-1) was mixed with the fluid catalytic cracking residual oil (A) at a mass ratio of 95:5, thereby obtaining a raw material oil composition. The raw material oil composition was put into a test tube and subjected to a heat treatment at 500° C. for 3 hours under normal pressure for coking, thereby obtaining a coking coal composition. The coking coal composition was pulverized with a hammer type mill such that the average particle diameter measured by a laser diffraction type particle size distribution measuring device reached 52.2 μm. The obtained pulverized material was put into a graphite crucible, embedded an Acheson furnace with coke breeze, and graphitized at 3050° C. Here, a treatment of increasing the temperature from room temperature to 3050° C. for a heating time of 130 hours, holding the temperature at 3050° C. for a holding time of 8 hours, and allowing the material to be naturally cooled for 25 days, and taking out the resultant was performed. The obtained graphite material was pulverized with an air flow jet mill such that the average particle diameter thereof measured by a laser diffraction type particle size distribution measuring device reached 9.2 μm, thereby obtaining a synthetic graphite material. The size L (112) of the crystallite, the surface area based on the volume, the oil absorption, and ΔHpp (4.8K) of the obtained synthetic graphite material are listed in Table 1.

Example 6

The synthetic graphite material obtained in Example 3 was mixed with the synthetic graphite material obtained in Comparative Example 2 at a weight ratio of 50:50, thereby obtaining a mixture.

Example 7

The synthetic graphite obtained in Example 3 was mixed with the synthetic graphite obtained in Comparative Example 2 at a weight ratio of 30:70, thereby obtaining a mixture.

Example 8

The synthetic graphite obtained in Example 3 was mixed with the synthetic graphite obtained in Comparative Example 2 at a weight ratio of 20:80, thereby obtaining a mixture.

<Preparation of Battery for Evaluation>

The lithium ion secondary battery 10 shown in FIG. 1 was prepared as a battery for evaluation according to the method described below. As the negative electrode 11, the negative electrode current collector 12, the positive electrode 13, the positive electrode current collector 14, and the separator 15, those described below were used.

(Negative Electrode 11 and Negative Electrode Current Collector 12)

Any of the synthetic graphite materials obtained in Examples 1 to 8 and Comparative Example 1 to 5, a carboxymethyl cellulose (CMC (BSH-6, manufactured by DKS Co., Ltd.)) aqueous solution as a binding agent adjusted to have a concentration of 1.5% by mass, and an aqueous solution in which styrene-butadiene rubber (SBR) as a binding agent was dispersed at a concentration of 48% by mass were mixed at a solid content mass ratio of 98:1:1, thereby obtaining a paste-like negative electrode mixture. The entire one surface of copper foil having a thickness of 18 μm serving as the negative electrode current collector 12 was coated with the obtained negative electrode mixture, dried, and rolled to obtain a negative electrode sheet in which the negative electrode 11 which was a layer formed of the negative electrode mixture was formed on the negative electrode current collector 12. The amount of the negative electrode mixture applied onto the negative electrode sheet per unit area was adjusted such that the mass of the graphite material reached approximately 10 mg/cm².

Thereafter, the negative electrode sheet was cut into a width of 32 mm and a length of 52 mm. Further, a part of the negative electrode 11 was scraped off in a direction perpendicular to the longitudinal direction of the sheet to expose the negative electrode current collector 12 functioning as a negative electrode lead plate.

(Positive Electrode 13 and Positive Electrode Current Collector 14)

Lithium cobaltate $LiCoO_2$ (CELLSEED C0N, manufactured by Nippon Chemical Industrial Co., Ltd.) having an average particle diameter of 10 μm as a positive electrode material, polyvinylidene fluoride (KF #1120, manufactured by Kureha Corporation) as a binding agent, and acetylene black (DENKA BLACK, manufactured by Denka Co., Ltd.) as a conductive assistant were mixed at a mass ratio of 89:6:5, and N-methyl-2-pyrrolidinone was added thereto as a solvent so that the mixture was kneaded, thereby obtaining a paste-like positive electrode mixture. The entire one surface of aluminum foil having a thickness of 30 μm serving as the positive electrode current collector 14 was coated with the obtained positive electrode mixture, dried, and rolled to obtain a positive electrode sheet in which the positive electrode 13 which was a layer formed of the positive electrode mixture was formed on the positive electrode current collector 14. The amount of the positive electrode mixture applied onto the positive electrode sheet per unit area was adjusted such that the mass of the lithium cobaltate reached approximately 20 mg/cm$^2$.

Thereafter, the positive electrode sheet was cut into a width of 30 mm and a length of 50 mm. Further, a part of the positive electrode 13 was scraped off in a direction perpendicular to the longitudinal direction of the sheet to expose the positive electrode current collector 14 functioning as a positive electrode lead plate.

(Separator 15)

As the separator 15, cellulose-based non-woven fabric (TF40-50, manufactured by Nippon Kodoshi Corporation) was used.

First, the negative electrode sheet in which the negative electrode 11, the negative electrode current collector 12, and the negative electrode lead plate were integrated with each other, the positive electrode sheet in which the positive electrode 13, the positive electrode current collector 14, and the positive electrode lead plate were integrated with each other, the separator 15, and other members used for the lithium ion secondary battery 10 were dried in order to prepare the lithium ion secondary battery 10 shown in FIG. 1. Specifically, the negative electrode sheet and the positive electrode sheet were dried at 120° C. under reduced pressure for 12 hours or longer. Further, the separator 15 and other members were dried at 70° C. under reduced pressure for 12 hours or longer.

Next, the negative electrode sheet, the positive electrode sheet, the separator 15, and other members which had been dried were assembled in an argon gas circulation type glove box at which the dew point was controlled to −60° C. or lower. In this manner, as shown in FIG. 1, the positive electrode 13 and the negative electrode 11 were laminated so as to face each other through the separator 15 to obtain a single-layer electrode body fixed with polyimide tape (not shown). Further, the negative electrode sheet and the positive electrode sheet were laminated such that the peripheral edge portion of the laminated positive electrode sheet was disposed to be surrounded by the inside of the peripheral edge portion of the negative electrode sheet.

Next, the single-layer electrode body was accommodated in the aluminum laminate exterior 16, and an electrolytic solution was injected thereinto. An electrolytic solution obtained by dissolving lithium hexafluorophosphate ($LiPF_6$) as an electrolyte in a solvent at a concentration of 1 mol/L and further mixing vinylene carbonate (VC) with the solution at a concentration of 1% by mass was used as the electrolytic solution. A solvent obtained by mixing ethylene carbonate (EC) and ethyl methyl carbonate (EMC) at a volume ratio of 3:7 was used as the solvent.

Thereafter, the aluminum laminate exterior 16 was heat-fused in a state where the positive electrode lead plate and the negative electrode lead plate protruded.

By performing the above-described steps, the sealed lithium ion secondary batteries 10 of Examples 1 to 8 and Comparative Examples 1 to 5 were obtained.

<Charge and Discharge Test of Battery for Evaluation>

A charge and discharge test described below was performed on each of the lithium ion secondary batteries 10 of Examples 1 to 8 and Comparative Examples 1 to 5.

First, a preliminary test for detecting abnormalities in the batteries was performed. That is, each battery was placed in a thermostatic chamber at 25° C., charged with a constant current of 4 mA until the battery voltage reached 4.2 V, paused for 10 minutes, and discharged with the same constant current until the battery voltage reached 3.0 V. These charge, pause, and discharge were defined as one charge and discharge cycle, and the preliminary test was performed by repeating the charge and discharge cycle three times under the same conditions.

By performing this preliminary test, it was confirmed that all the batteries of Examples 1 to 8 and Comparative Examples 1 to 5 did not have abnormalities. Thereafter, the following main test was performed. In addition, the preliminary test is not included in the number of cycles of the main test.

In the main test, each battery was placed in a thermostatic chamber at 25° C., charged with a constant current at a constant voltage by setting the charging current to 30 mA, the charging voltage to 4.2 V, and the charging time to 3 hours, paused for 10 minutes, and discharged with the same charging current (30 mA) until the battery voltage reached 3.0 V. These charge, pause, and discharge were defined as one charge and discharge cycle, and the discharge capacity in the third cycle was defined as the "initial discharge capacity" by repeating the charge and discharge cycle three times under the same conditions.

Next, the battery was placed in a thermostatic chamber at a set temperature of 0° C. and allowed to stand still for 5 hours, and the charge and discharge cycle was repeated 100 times under the same conditions as those for the charge and discharge cycle from which the initial discharge capacity was acquired. Thereafter, the battery was placed in a thermostatic chamber at 25° C. again and allowed to stand still for 5 hours, the charge and discharge cycle was repeated three times under the same conditions as those for the charge and discharge cycle from which the initial discharge capacity was acquired, and the discharge capacity in the third cycle was defined as the "discharge capacity after charging and discharging of the battery were repeated at a temperature of 0° C."

As an index showing the capacity degradation after charging and discharging of the battery were repeated at a temperature of 0° C., the retention rate (%) of the "discharge capacity after repetition of charging and discharging of the battery at a temperature of 0° C." with respect to the "initial discharge capacity" described above was calculated based on the following (Mathematical Formula 1).

The results thereof are listed in Table 1.

$$\begin{pmatrix} \text{Retention rate of} \\ \text{discharge capacity} \\ \text{after repetition of} \\ \text{charging and} \\ \text{discharging of} \\ \text{battery at } 0° \text{ C.} \end{pmatrix} = \frac{(\text{Initial capacity})}{\begin{pmatrix} \text{Discharge capacity} \\ \text{after repetition of} \\ \text{charging and} \\ \text{discharging of} \\ \text{battery at } 0° \text{ C.} \end{pmatrix}} \times 100 \quad \text{(Equation 1)}$$

which has a sulfur content of 0.4% by mass or less and does not contain the first heavy oil, thereby obtaining a raw material oil composition in which the content of the first heavy oil is in a range of 15% to 80% by mass. In the lithium ion secondary battery obtained by using such a synthetic graphite material for the negative electrode, the capacity degradation in a case where charging and discharging of the battery are repeated at a temperature of 0° C. is suppressed. On the contrary, it was also confirmed that in the lithium ion secondary batteries obtained by using the synthetic graphite materials of Comparative Examples 1 to 5 which were produced using raw material oil compositions other than

TABLE 1

| Example | Raw material oil composition | | | Physical properties of synthetic graphite material | | | | Battery characteristics |
|---|---|---|---|---|---|---|---|---|
| | Desulfurized fluid catalytic cracking residual oil (% by mass) | Fluid catalytic cracking residual oil (% by mass) | Hydrodesulfurized oil (% by mass) | L (112) (nm) | Surface area based on volume (m²/cm³) | Oil absorption (mL/100 g) | ΔHpp (4.8K) (gauss) | Discharge capacity retention rate after repetition of charging and discharging of battery at 0° C. (%) |
| Example 1 | 80 | 0 | 20 | 4 | 1.700 | 72 | 65 | 92.5 |
| Example 2 | 15 | 65 | 20 | 11 | 0.572 | 67 | 41 | 93.6 |
| Example 3 | 40 | 40 | 20 | 17 | 0.764 | 103 | 55 | 94.7 |
| Example 4 | 30 | 50 | 20 | 30 | 0.220 | 131 | 44 | 93.2 |
| Example 5 | 70 | 10 | 20 | 24 | 0.982 | 147 | 69 | 92.0 |
| Comparative Example 1 | 100 | 0 | 0 | 5 | 1.855 | 59 | 73 | 84.3 |
| Comparative Example 2 | 10 | 60 | 20 | 8 | 0.633 | 53 | 43 | 62.3 |
| Comparative Example 3 | 5 | 75 | 20 | 13 | 0.433 | 74 | 35 | 64.8 |
| Comparative Example 4 | 0 | 100 | 0 | 27 | 0.269 | 157 | 39 | 69.6 |
| Comparative Example 5 | 95 | 5 | 0 | 22 | 0.871 | 164 | 78 | 72.8 |
| Example 6 | — | — | — | — | — | — | — | 91.3 |
| Example 7 | — | — | — | — | — | — | — | 90.8 |
| Example 8 | — | — | — | — | — | — | — | 89.5 |

As listed in Table 1, the "discharge capacity retention rates (%) after charging and discharging of the battery were repeated at a temperature of 0° C." in the lithium ion secondary batteries obtained by using the synthetic graphite materials of Example 1 to 5 for the negative electrodes were 92% or greater, but the discharge capacity retention rates of the lithium ion secondary batteries obtained by using the synthetic graphite materials of Comparative Examples 1 to 5, which were out of the range of the invention of the present application, for the negative electrodes were in a range of 62.3% to 84.3%, which were low, and thus it was confirmed that the degradation in a case where charging and discharging of the battery were repeated at a temperature of 0° C. was not suppressed.

Further, as listed in Table 1, raw material oil compositions containing specific first heavy oil and specific second heavy oil are used as raw materials in the synthetic graphite materials obtained in Examples 1 to 5. That is, fluid catalytic cracking residual oil is brought into contact with a catalyst layer (A) having an average pore diameter of 141 to 200 Å and a catalyst layer (B) having an average pore diameter of 65 to 110 Å in order, which are filled with a catalyst obtained by allowing an inorganic oxide carrier to carry one or more metals selected from Group 6A metals and Group 8 metals in the periodic table, to obtain hydrodesulfurized first heavy oil, and the first heavy oil is mixed with the second heavy oil those described above as the raw materials for the negative electrodes, the degradation was not suppressed.

Meanwhile, in the lithium ion secondary batteries in which the mixtures obtained by mixing the synthetic graphite material of Example 3 with the synthetic graphite material of Comparative Example 2 at a weight ratio of 50:50, 30:70, and 20:80 were used for the negative electrodes, the capacity retention rates were respectively 91.3%, 90.8%, and 89.5% even in a case where 100 cycles of charging and discharging were repeated at a temperature of 0° C. Since the capacity retention rate of the lithium ion secondary battery in which the synthetic graphite material of Example 3 was used alone for the negative electrode was 94.7% and the capacity retention rate of Comparative Example 2 was 62.3%, it was confirmed that the additive property of the capacity retention rate was not established. The reason for this is not clear, but there is a possibility that the lithium ions temporarily occluded in the synthetic graphite material of Example 3 were occluded in the synthetic graphite of Comparative Example 2 only by diffusion in the solid phase without using the liquid phase (electrolytic solution). As described above, it was confirmed that the lithium ion secondary battery obtained by using the negative electrode containing at least the synthetic graphite material of the present invention can suppress the degradation of the discharge capacity due to the repetition of the charge and discharge cycles at 0° C.

INDUSTRIAL APPLICABILITY

In the lithium ion secondary battery having a negative electrode containing the synthetic graphite material according to the present invention, degradation of the discharge capacity due to repetition of charging and discharging of the battery at 0° C. is unlikely to occur. Therefore, the lithium ion secondary battery of the present invention can be preferably used for industrial purposes such as applications for automobiles such as hybrid automobiles, plug-in hybrid automobiles, and electric automobiles and power storage of system infrastructures.

REFERENCE SIGNS LIST

10: Lithium ion secondary battery
11: Negative electrode
12: Negative electrode current collector
13: Positive electrode
14: Positive electrode current collector
15: Separator
16: Aluminum laminate exterior

What is claimed is:

1. A synthetic graphite material,
wherein a size L(112) of a crystallite in a c-axis direction as calculated from a (112) diffraction line obtained by an X-ray wide angle diffraction method is in a range of 4 to 30 nm,
a surface area based on a volume as calculated by a laser diffraction type particle size distribution measuring device is in a range of 0.22 to 1.70 $m^2/cm^3$,
an oil absorption is in a range of 67 to 147 mL/100 g,
a spectrum derived from carbon appearing in an electron spin resonance method as measured using an X band is in a range of 3200 to 3410 gauss, and
ΔHpp, which is a line width of the spectrum as calculated from a first derivative spectrum of the spectrum at a temperature of 4.8K, is in a range of 41 to 69 gauss.

2. A production method of the synthetic graphite material according to claim 1, comprising at least:
a step of performing a coking treatment on a raw material oil composition by performing a delayed coking process to generate a coking coal composition;
a step of pulverizing the coking coal composition to obtain coking coal powder;
a step of performing a heat treatment on the coking coal powder to obtain graphite powder; and
a step of pulverizing the graphite powder.

3. The production method according to claim 2, further comprising:
a step of bringing fluid catalytic cracking residual oil into contact with a catalyst layer (A) having an average pore diameter of 141 to 200 Å and a catalyst layer (B) having an average pore diameter of 65 to 110 Å in order, which are filled with a catalyst obtained by allowing an inorganic oxide carrier to carry one or more metals selected from Group 6A metals and Group 8 metals in the periodic table, to obtain hydrodesulfurized first heavy oil; and
a step of mixing the first heavy oil with second heavy oil which has a sulfur content of 0.4% by mass or less and does not contain the first heavy oil to obtain a raw material oil composition,
wherein a content of the first heavy oil in the raw material oil composition is in a range of 15% to 80% by mass.

4. A negative electrode for a lithium ion secondary battery, comprising:
the synthetic graphite material according to claim 1.

5. A lithium ion secondary battery comprising:
the negative electrode according to claim 4.

* * * * *